US010234309B2

(12) United States Patent
Artusio-Glimpse et al.

(10) Patent No.: US 10,234,309 B2
(45) Date of Patent: Mar. 19, 2019

(54) PHOTON MOMENTUM SENSOR

(71) Applicant: The United States of America, as Represented by the Secretary of Commerce, Washington, DC (US)

(72) Inventors: Alexandra Artusio-Glimpse, Boulder, CO (US); John Lehman, Boulder, CO (US); Michelle Stephens, Boulder, CO (US); Nathan Tomlin, Boulder, CO (US); Paul Williams, Erie, CO (US); Ivan Ryger, Boulder, CO (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 0 days.

(21) Appl. No.: 15/620,746

(22) Filed: Jun. 12, 2017

(65) Prior Publication Data
US 2018/0299299 A1    Oct. 18, 2018

Related U.S. Application Data

(60) Provisional application No. 62/486,644, filed on Apr. 18, 2017.

(51) Int. Cl.
*H01J 40/14*    (2006.01)
*G01D 5/28*    (2006.01)

(52) U.S. Cl.
CPC .................................. *G01D 5/285* (2013.01)

(58) Field of Classification Search
CPC .............. G01D 5/28; G01D 5/285; G01J 1/04
USPC ....... 250/214.1, 336.1, 370.08; 356/213, 216
See application file for complete search history.

(56) References Cited

U.S. PATENT DOCUMENTS

| 6,621,084 B1 * | 9/2003 | Wainer .................... G01T 1/172 |
| | | 250/370.01 |
| 7,495,199 B2 * | 2/2009 | Jankowiak ................ G01J 5/46 |
| | | 250/200 |
| 9,625,313 B2 | 4/2017 | Lehman et al. |
| 2016/0334440 A1 | 11/2016 | Fertig et al. |

OTHER PUBLICATIONS

P. Williams, et al., "Exploring optical radiation pressure as a convenient measure of high-power laser emission", CORM: Council for for Optical Radiation Measurements, 2015.
(Continued)

*Primary Examiner* — Kevin Pyo
(74) *Attorney, Agent, or Firm* — Office of Chief Counsel for National Institute of Standards and Technology

(57) ABSTRACT

A photon momentum sensor includes: a reflector plate that includes: a central disk including a mirror; an annular member; a plurality of spring legs interposed between the central disk and the annular member, such that: the spring legs are interleaved; neighboring spring legs are spaced apart; and the spring legs individually are arranged in an Archimedean spiral that provides orthogonal motion of the central disk relative to the plane of the annular member; and a bias plate disposed opposing the reflector plate such that: the central disk of the reflector plate moves orthogonally to a plane of the bias plate in response to reflection of laser light, and the central disk and the bias plate are arranged spaced apart as a capacitive structure.

19 Claims, 26 Drawing Sheets

(56) References Cited

OTHER PUBLICATIONS

J. Lee, "Measuring tiny forces with light", NIST News, 2016.
International Search Report and Written Opinion dated Aug. 23, 2017 in the name of Government of the United States of America, as represented by the Secretary of Commerce.
P. Williams, et al., "Portable, high-accuracy, non-absorbing laser power measurement at kilowatt levels by means of radiation pressure", Optics Express, 2017, 4382-4392, 25.

* cited by examiner

PHOTON MOMENTUM SENSOR

CROSS REFERENCE TO RELATED APPLICATIONS

This application claims the benefit of U.S. Provisional Patent Application Ser. No. 62/486,644, filed Apr. 18, 2017, the disclosure of which is incorporated herein by reference in its entirety.

STATEMENT REGARDING FEDERALLY SPONSORED RESEARCH

This invention was made with United States Government support from the National Institute of Standards and Technology, an agency of the United States Department of Commerce. The Government has certain rights in the invention.

BRIEF DESCRIPTION

Disclosed is a photon momentum sensor comprising: a reflector plate that comprises: a central disk comprising a mirror that reflects a laser light, the central disk moving in response to reflection of the laser light; an annular member disposed peripherally around the central disk and in mechanical communication with the central disk such that: the central disk moves orthogonally to a plane of the annular member; a plurality of spring legs interposed between the central disk and the annular member and in mechanical communication with the central disk and the annular member, the plurality of spring legs comprising a first spring leg, a second spring leg, and a third spring leg, such that: the spring legs are interleaved; neighboring spring legs are spaced apart; and the spring legs individually are arranged in an Archimedean spiral that provides orthogonal motion of the central disk relative to the plane of the annular member; and a bias plate disposed opposing the reflector plate such that: the central disk of the reflector plate moves orthogonally to a plane of the bias plate in response to reflection of the laser light, and the central disk and the bias plate are arranged spaced apart as a capacitive structure.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
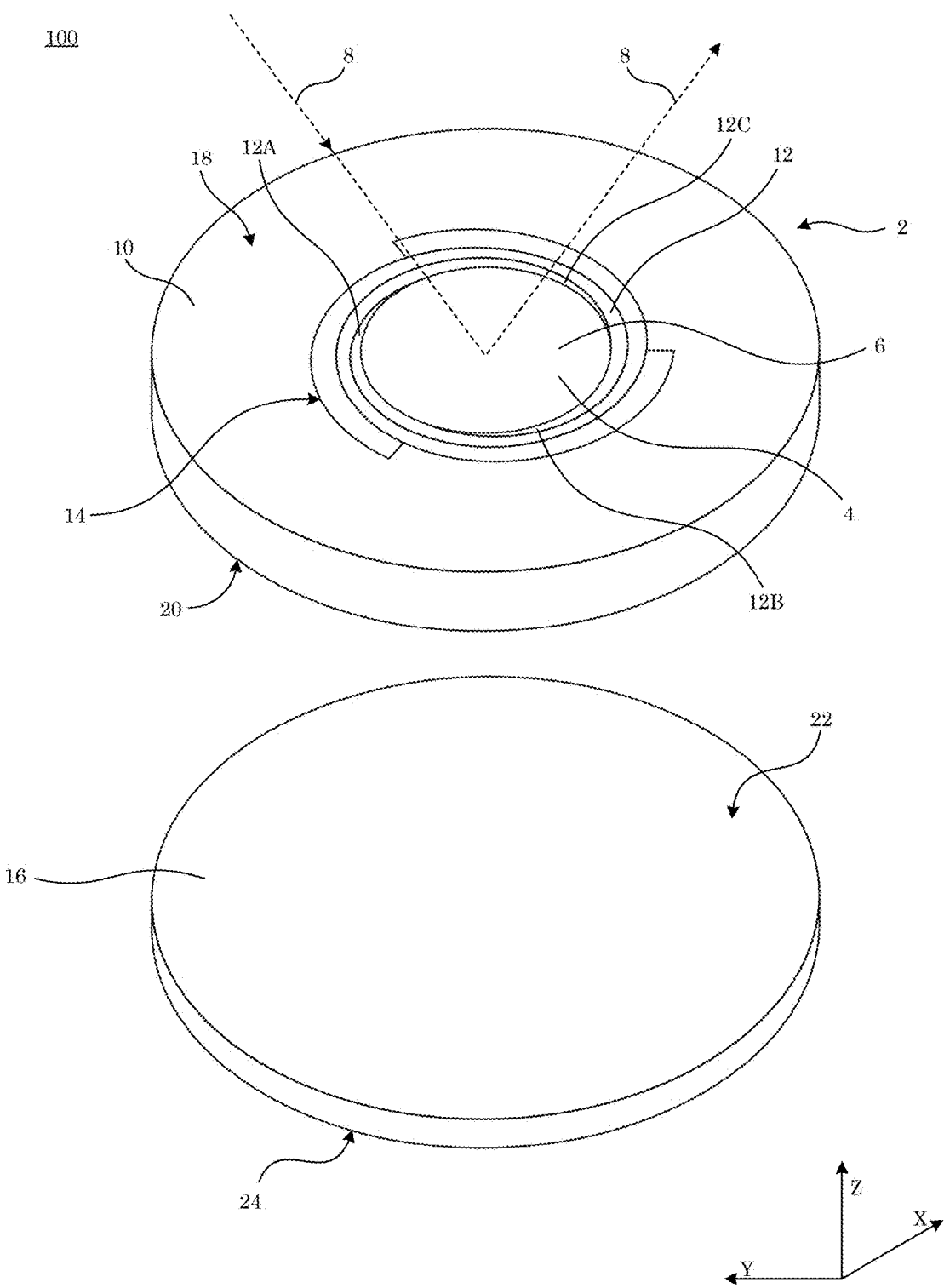
FIG. 1 shows a perspective view of a photon momentum sensor.
Figure 2:
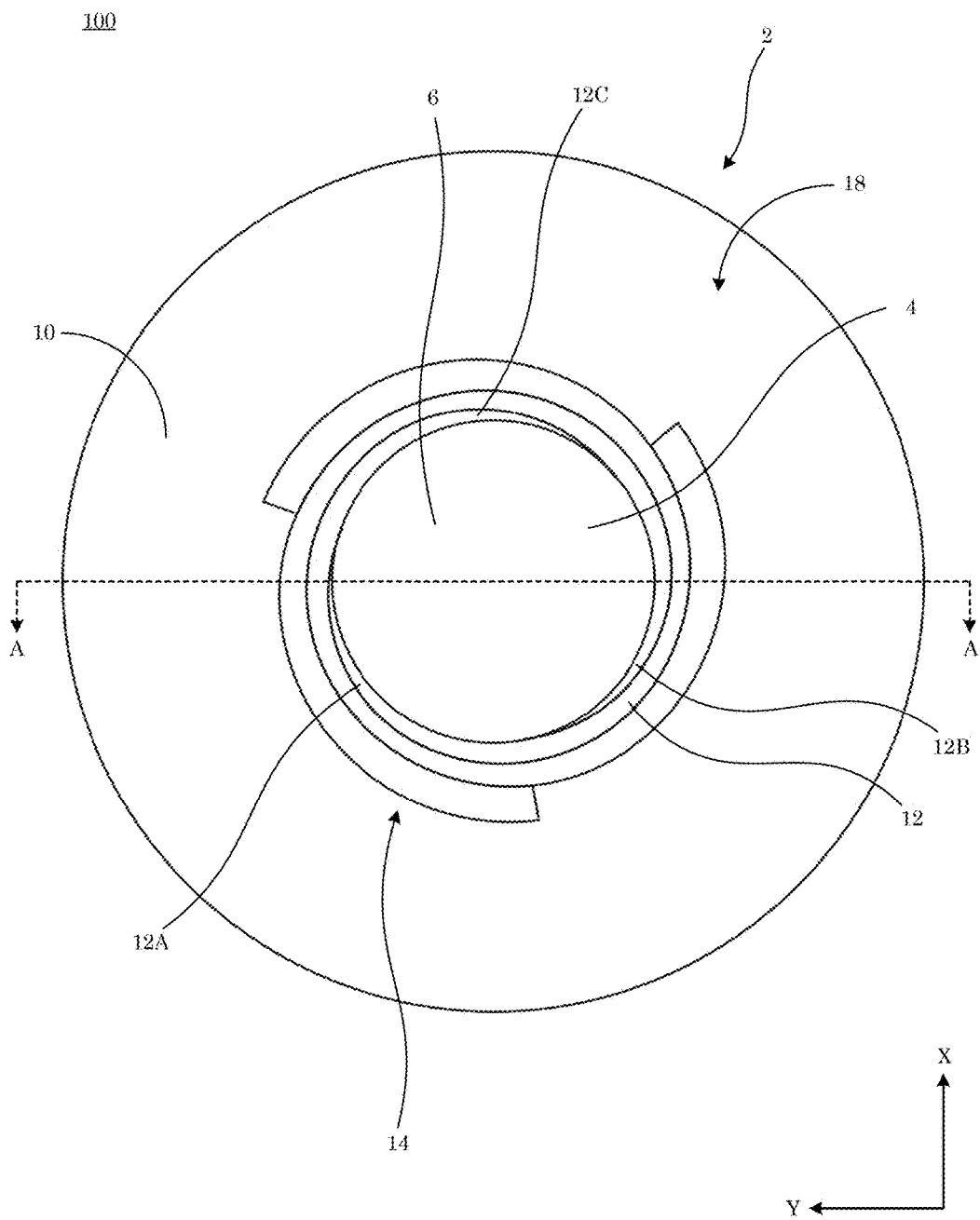
FIG. 2 shows a top view of the photon momentum sensor shown in FIG. 1.
Figure 3:
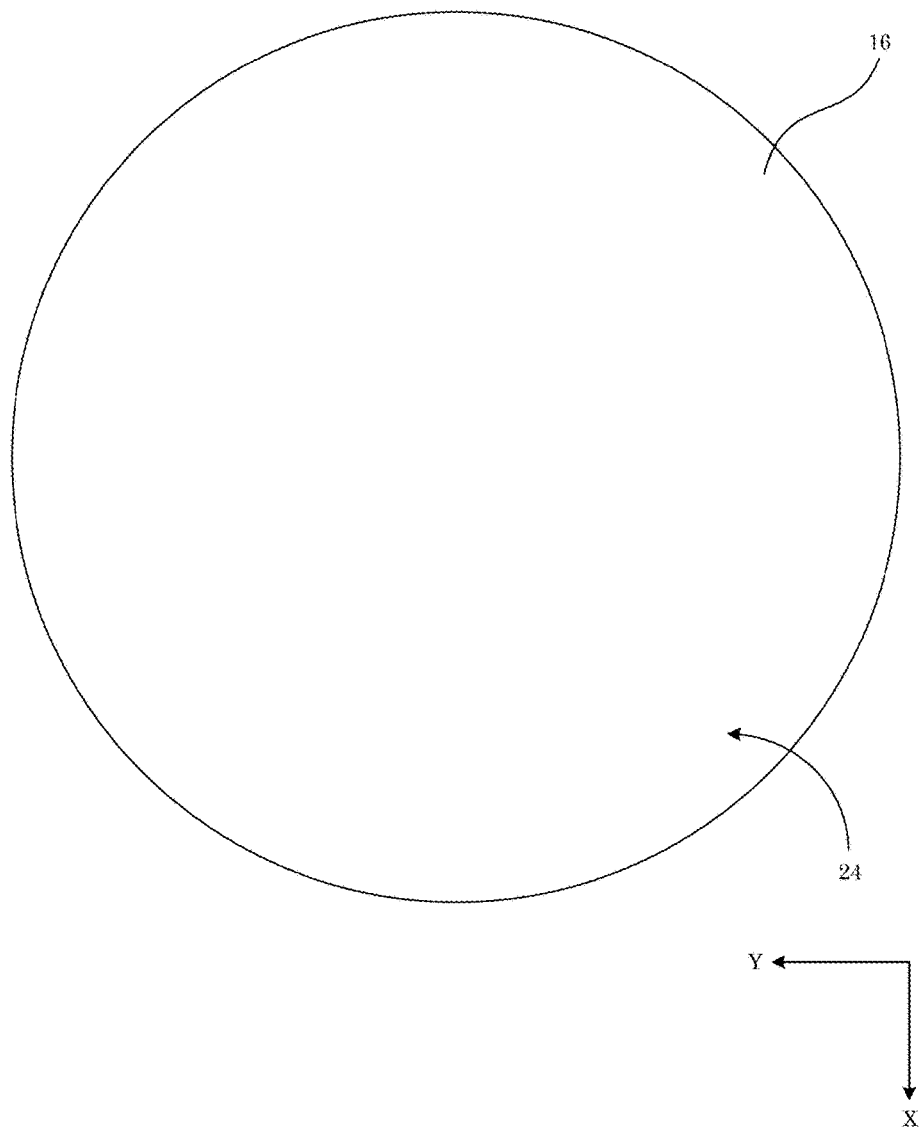
FIG. 3 shows a bottom view of the photon momentum sensor shown in FIG. 1.
Figure 4:
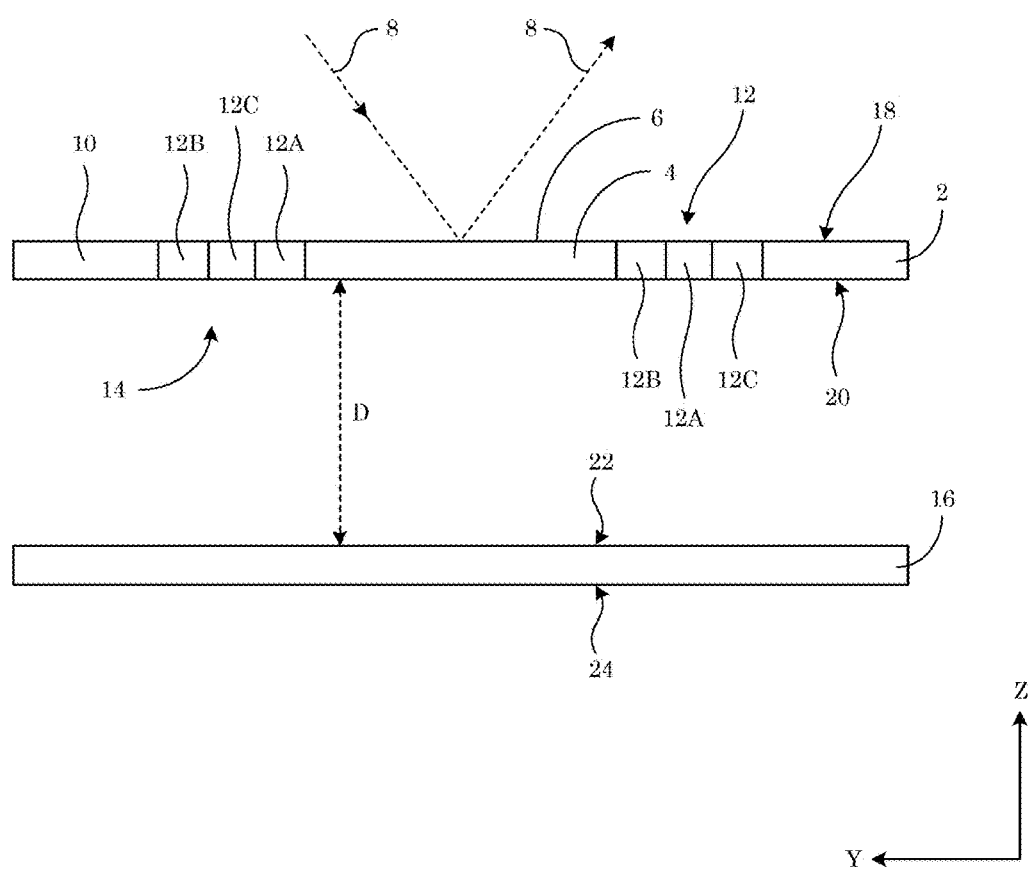
FIG. 4 shows a cross-section along line A-A of the photon momentum sensor shown in FIG. 2.
Figure 5:
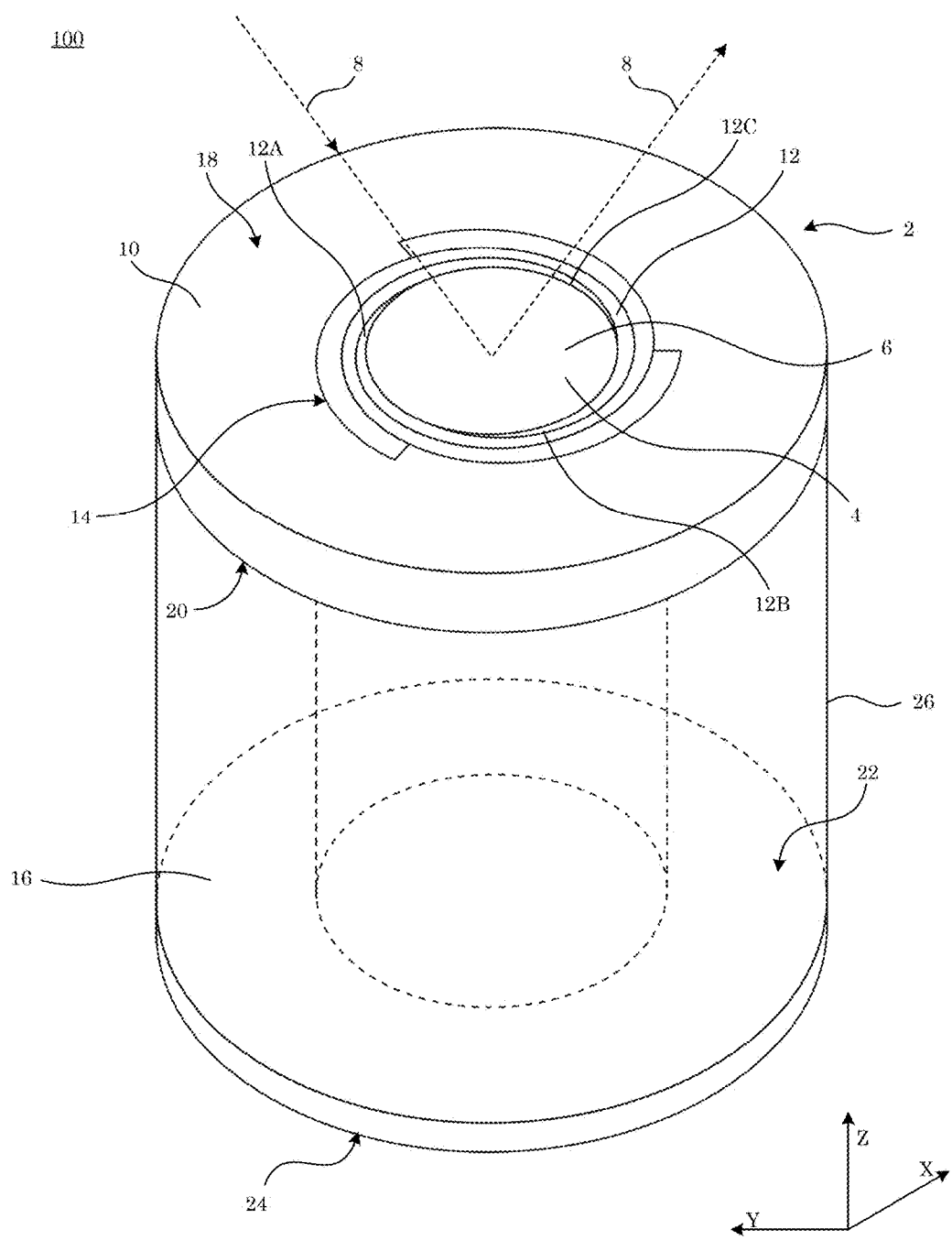
FIG. 5 shows a perspective view of a photon momentum sensor.
Figure 6:
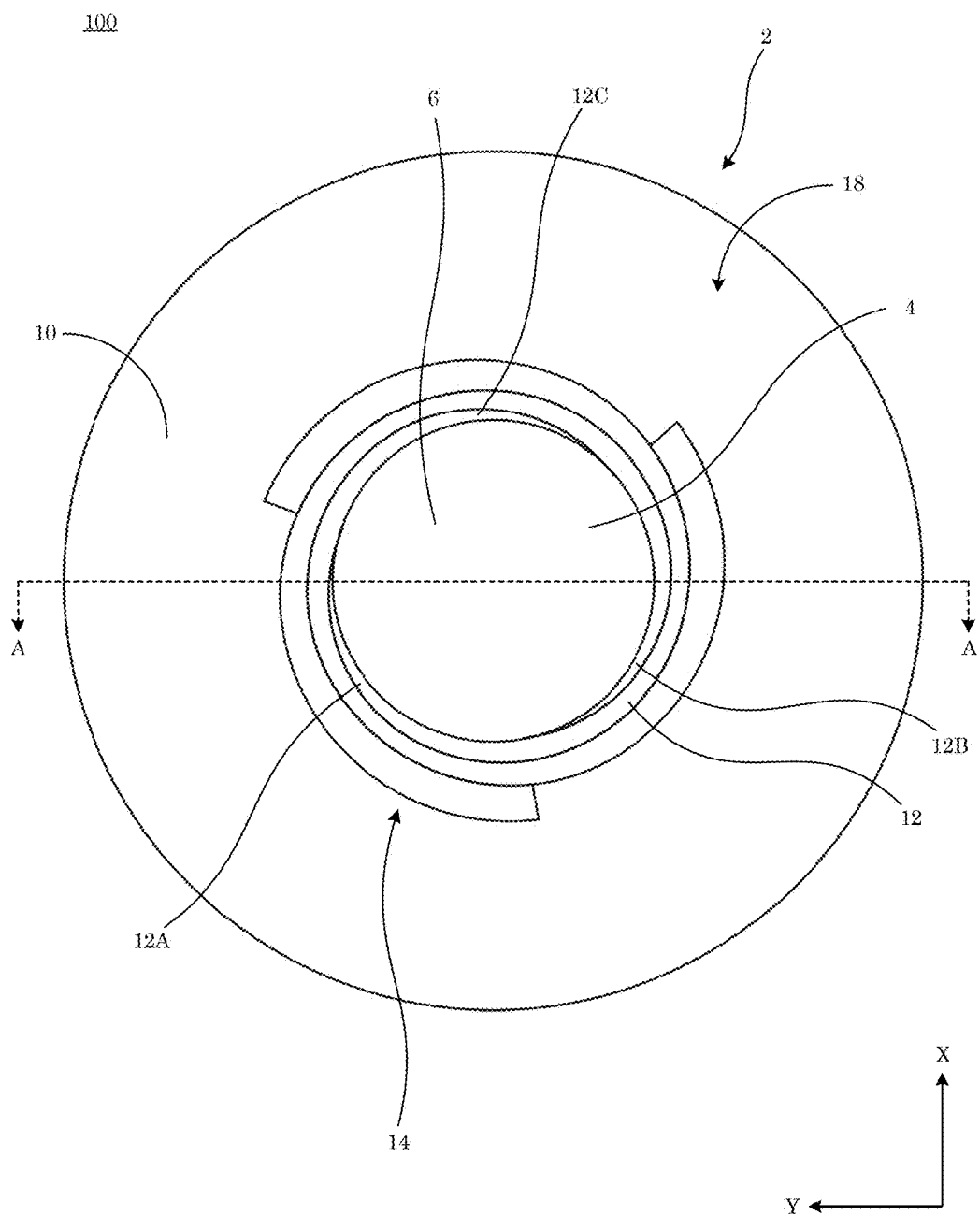
FIG. 6 shows a top view of the photon momentum sensor shown in FIG. 5.
Figure 7:
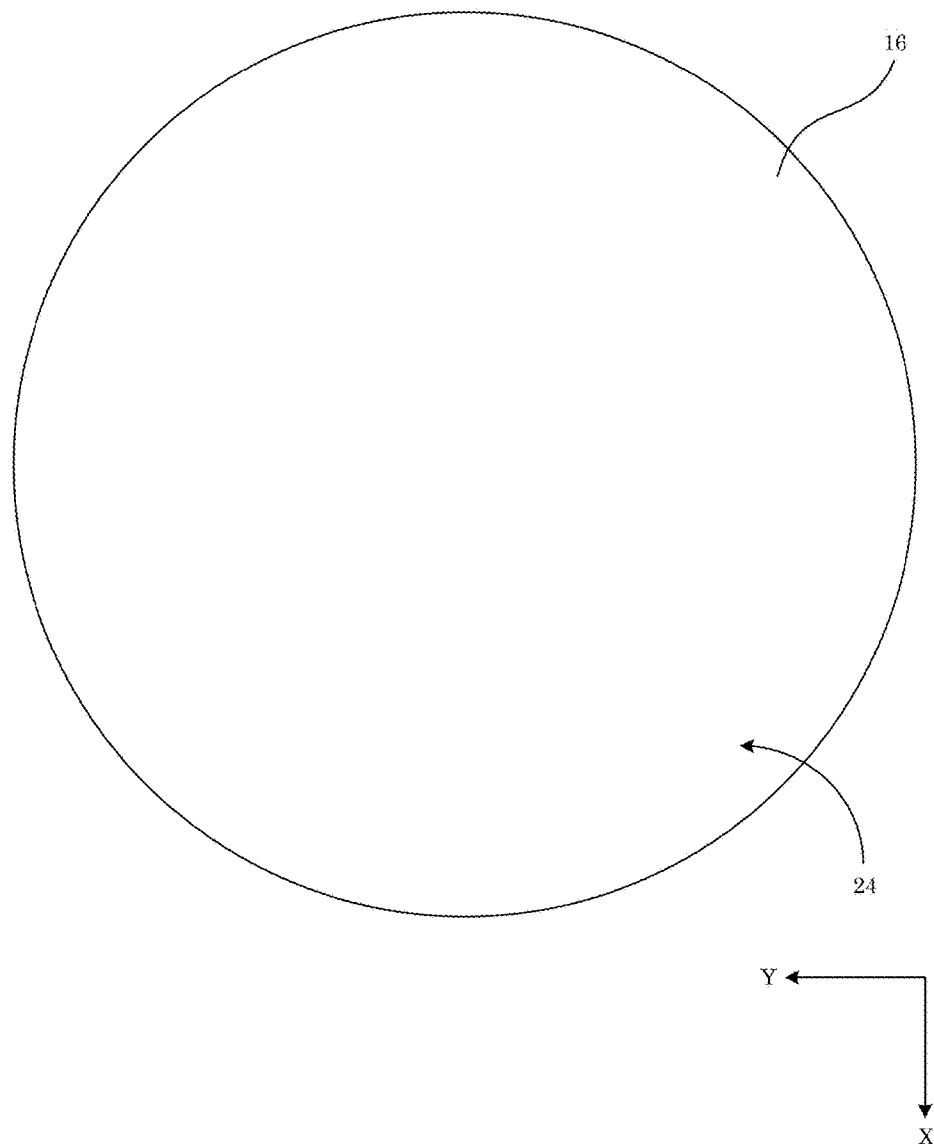
FIG. 7 shows a bottom view of the photon momentum sensor shown in FIG. 5.
Figure 8:
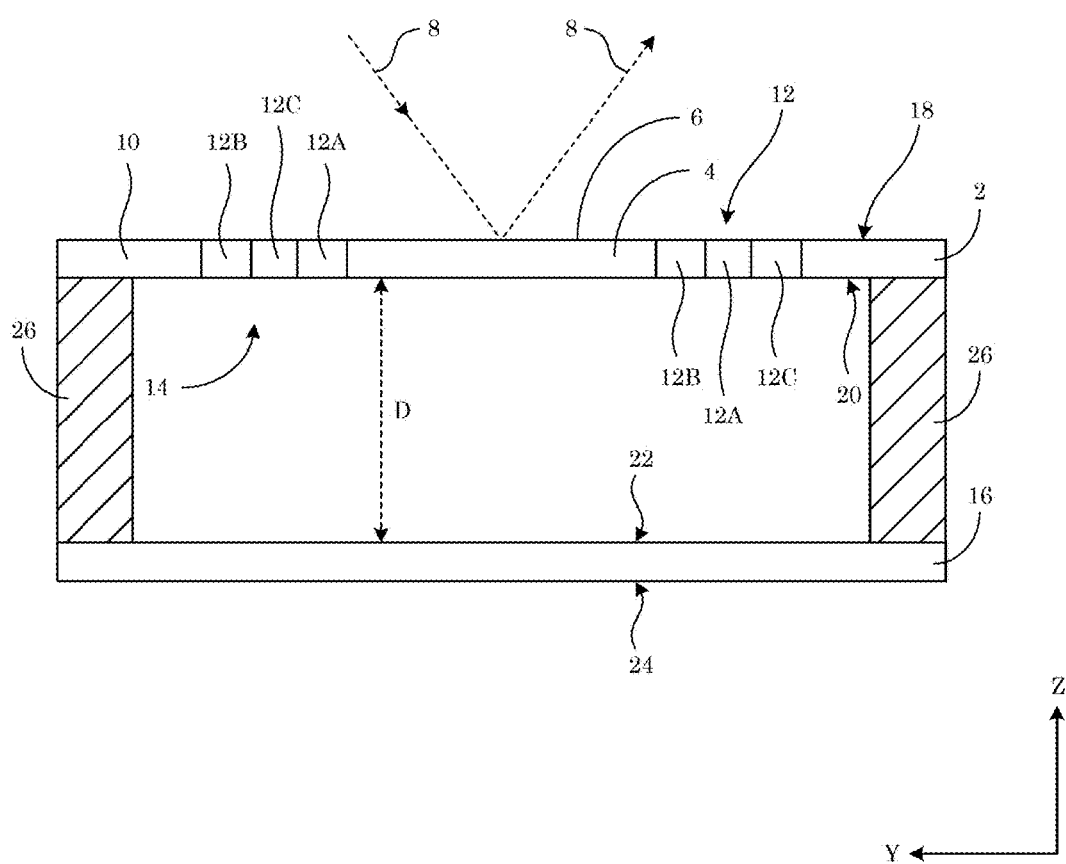
FIG. 8 shows a cross-section along line A-A of the photon momentum sensor shown in FIG. 6.
Figure 9:
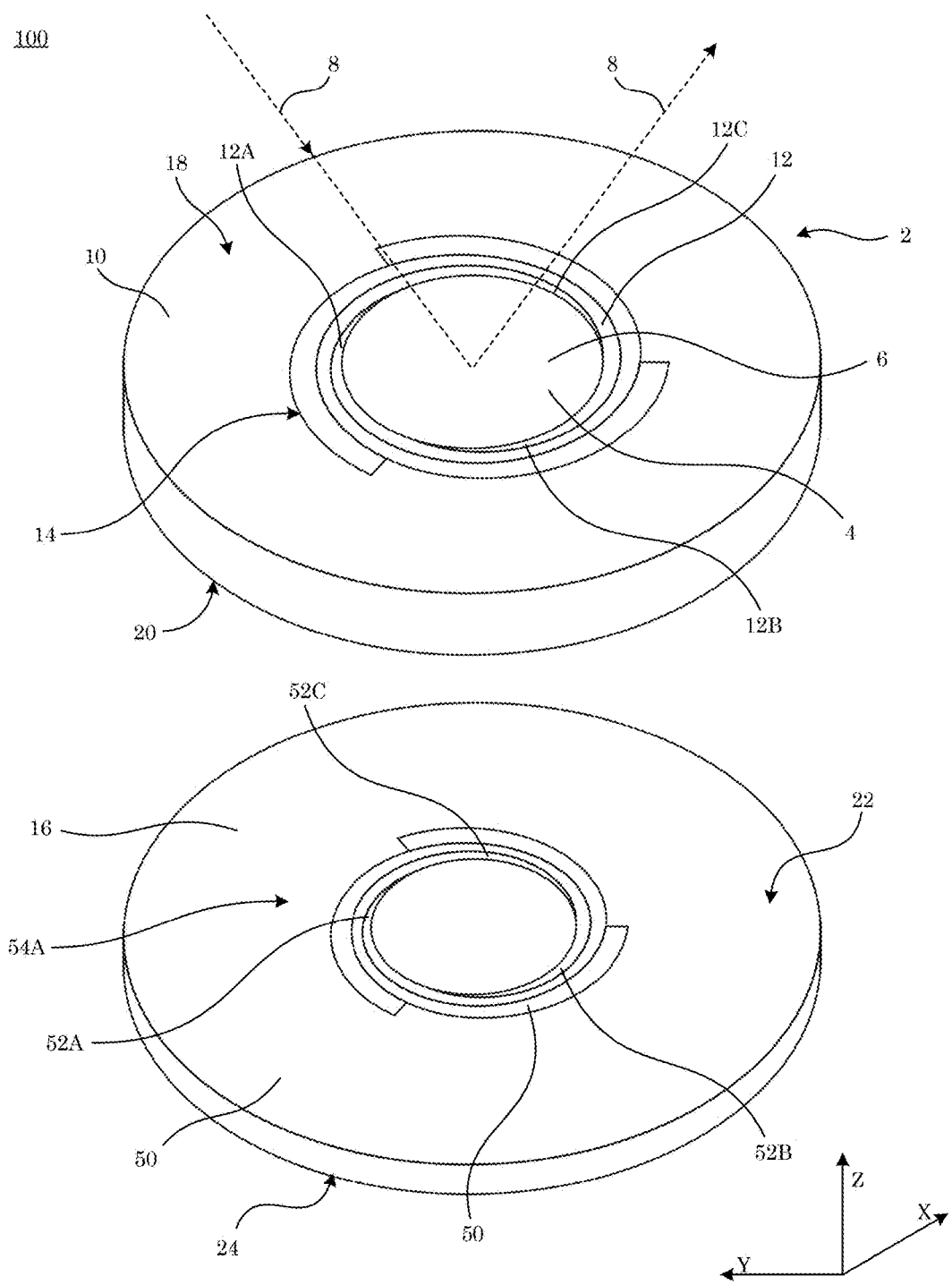
FIG. 9 shows a perspective view of a photon momentum sensor.
Figure 10:
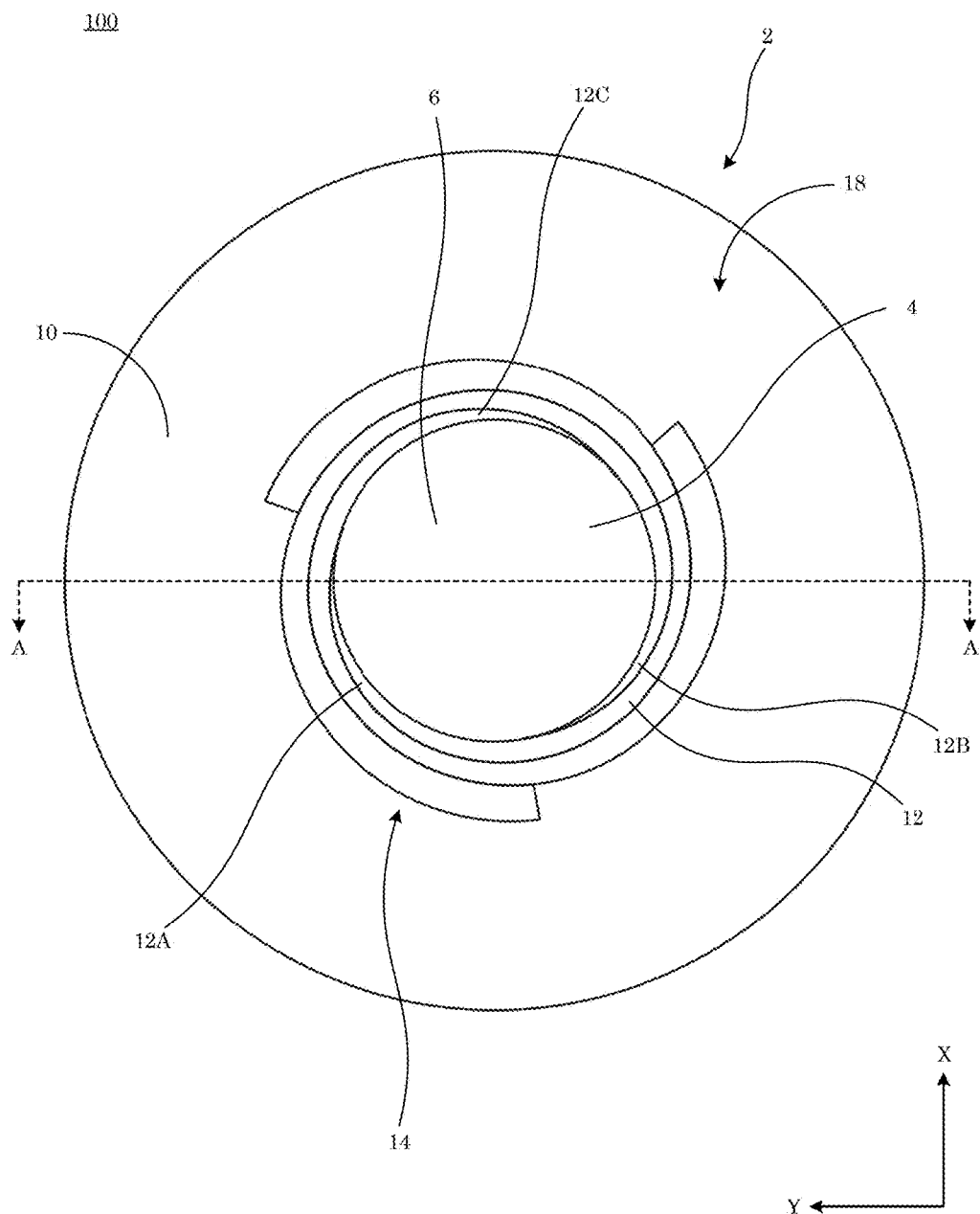
FIG. 10 shows a top view of the photon momentum sensor shown in FIG. 9.
Figure 11:
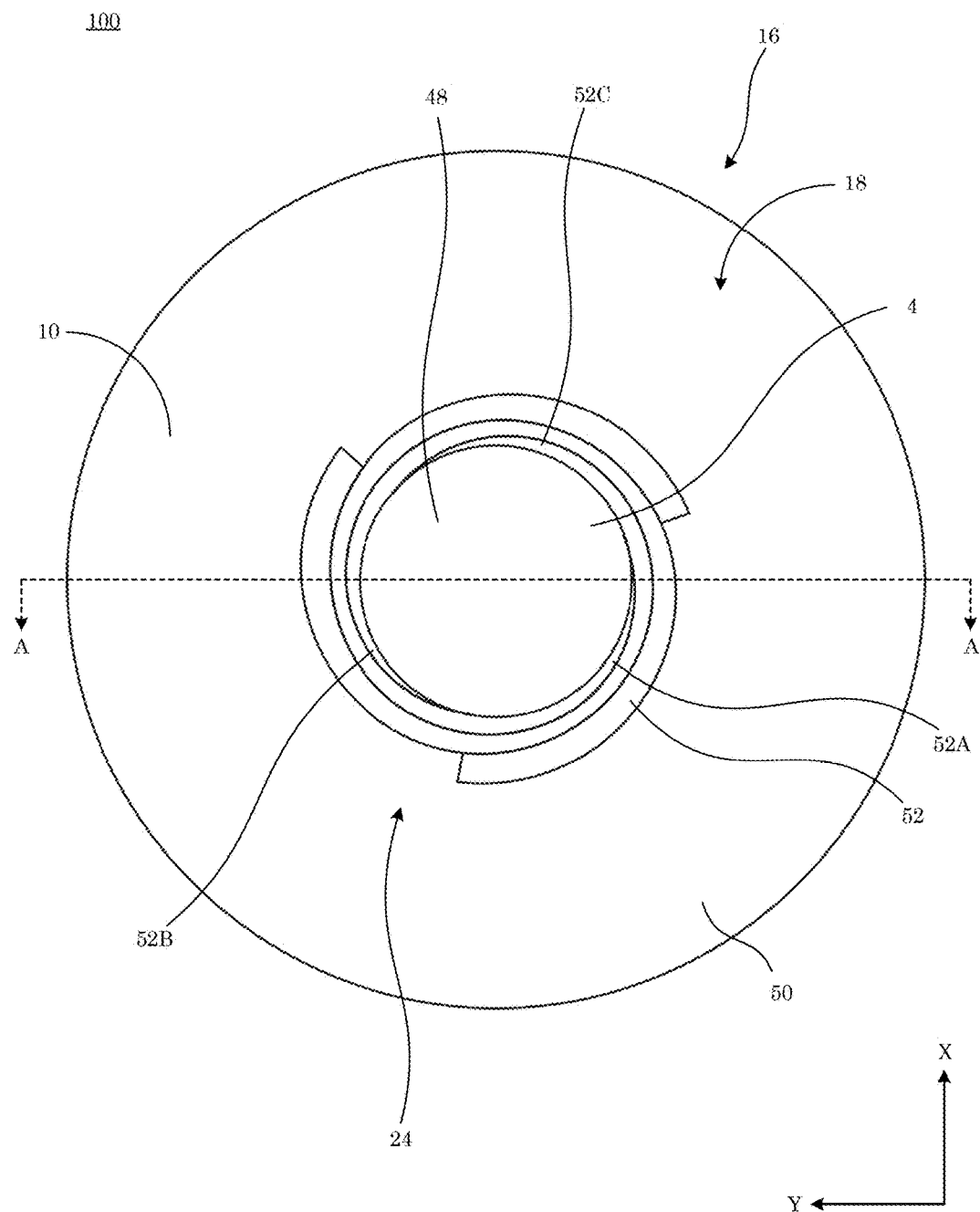
FIG. 11 shows a bottom view of the photon momentum sensor shown in FIG. 9.
Figure 12:
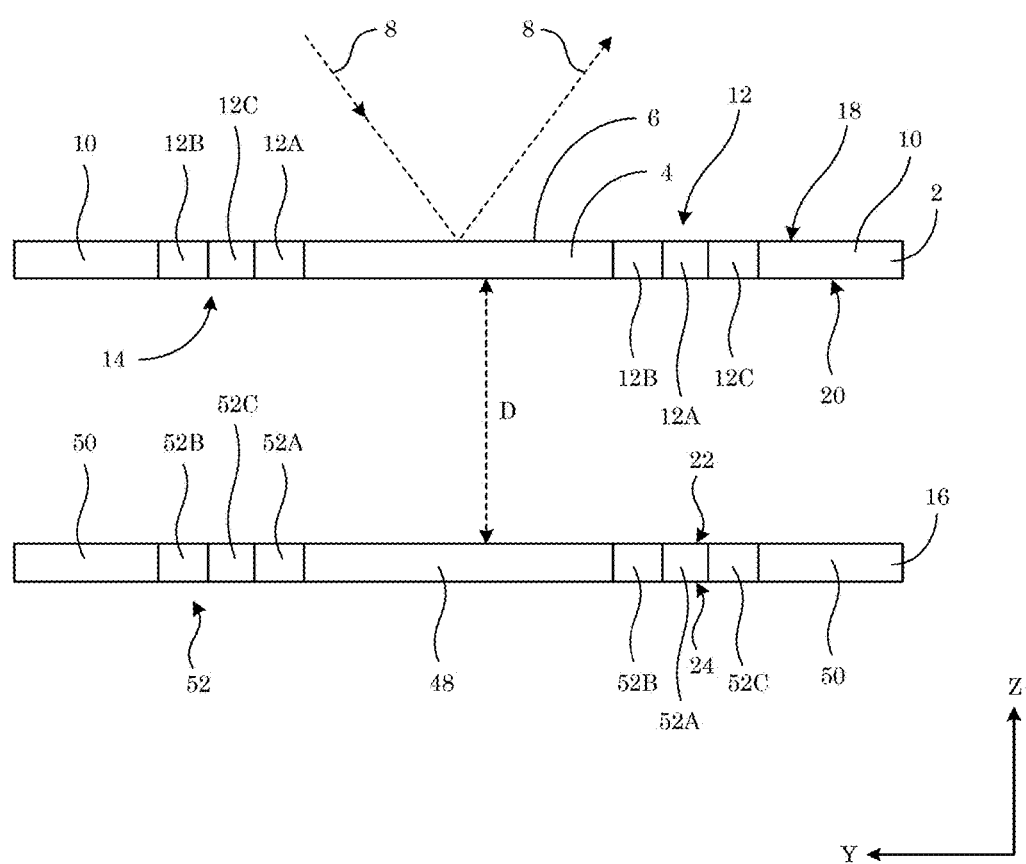
FIG. 12 shows a cross-section along line A-A of the photon momentum sensor shown in FIG. 10.

A detailed description of one or more embodiments is presented herein by way of exemplification and not limitation.

In an embodiment, with reference to FIG. 1, FIG. 2, FIG. 3, and FIG. 4, photon momentum sensor 100 includes reflector plate 2 that includes: central disk 4 including mirror 6 that reflects laser light 8, central disk 4 moving in response to reflection of laser light 8; annular member 10 disposed peripherally around central disk 4 and in mechanical communication with central disk 4 such that: central disk 4 moves orthogonally to a plane of annular member 10; a plurality of spring legs 12 interposed between central disk 4 and annular member 10 and in mechanical communication with central disk 4 and annular member 10, the plurality of spring legs 12 including first spring leg 12A, second spring leg 12B, and third spring leg 12C, such that: spring legs 12 are interleaved; neighboring spring legs 12 are spaced apart; and spring legs 12 individually are arranged in Archimedean spiral 14 that provides orthogonal motion of central disk 4 relative to the plane of annular member 10; and bias plate 16 disposed opposing reflector plate 2 such that: central disk 4 of reflector plate 2 moves orthogonally to a plane of bias plate 16 in response to reflection of laser light 8, and central disk 4 of reflector plate 2 and bias plate 16 are arranged spaced apart as a capacitive structure.

As used herein, "capacitive structure" refers to the geometrical arrangement of reflector plate 2 and bias plate 16 that provide for accumulating and holding a charge of electricity in response to charging conducting surfaces (e.g., second surface 20 of reflector plate 2 and third surface 22 of bias plate 16), wherein surfaces (e.g., second surface 20 of reflector plate 2 and third surface 22 of bias plate 16) having opposite signs of electrical charge and are separated by a dielectric.

In an embodiment, reflector plate 2 includes first surface 18 on which mirror 6 is disposed; and second surface 20 that is opposite first surface 18 and which opposes third surface 22 of bias plate 16. Here, second surface 20 is electrically conductive. According to an embodiment bias plate 16 includes third surface 22 that opposes second surface 20 of reflector plate 2, third surface 22 being electrically conductive, and fourth surface 24 that is opposite third side 22.

In an embodiment, with reference to FIG. 5, FIG. 6, FIG. 7, and FIG. 8, photon momentum sensor 100 includes spacer 26 interposed between annular member 10 of reflector plate 2 and bias plate 16 and that spaces apart reflector plate 2 and bias plate 16. Here, spacer 26 is present between annular member 10 of reflector plate 2 and bias plate 16 but absent between central disk 4 of reflector plate 2 and bias member 16, such that second surface 20 of central disk 4 of reflector plate 2 and third surface 22 of bias plate 16 are exposed to one another and separated by distance D. It should be appreciated that distance D changes in response to reflection of laser light 8 from mirror 6 disposed on central disk 4 of reflector plate 2.

In an embodiment, with reference to FIG. 9, FIG. 10, FIG. 11, and FIG. 12, photon momentum sensor 100 includes bias plate 16 that includes central disk 48. Moreover, bias plate 16 can further include annular member 50 disposed peripherally around central disk 48 of bias plate and 16 in mechanical communication with central disk 48 of bias plate 16 such that: central disk 48 of bias plate 16 moves orthogonally to a plane of annular member 50 of bias plate 16. Further, bias plate 16 can include a plurality of spring legs 52 interposed between central disk 48 of bias plate 16 and annular member 50 of bias plate 16 and in mechanical communication with central disk 48 of bias plate 16 and annular member 50 of bias plate 16, plurality of spring legs 50 including first spring leg 52A, second spring leg 52B, and third spring leg 52C, such that: spring legs 50 of bias plate 16 are interleaved; neighboring spring legs 52 of bias plate 16 are spaced apart; and spring legs 52 of bias plate 16 individually are arranged in Archimedean spiral 54 that provides orthogonal motion of 48 central disk of bias plate 16 relative to the plane of annular member 50 of bias plate 16.

Figure 13:
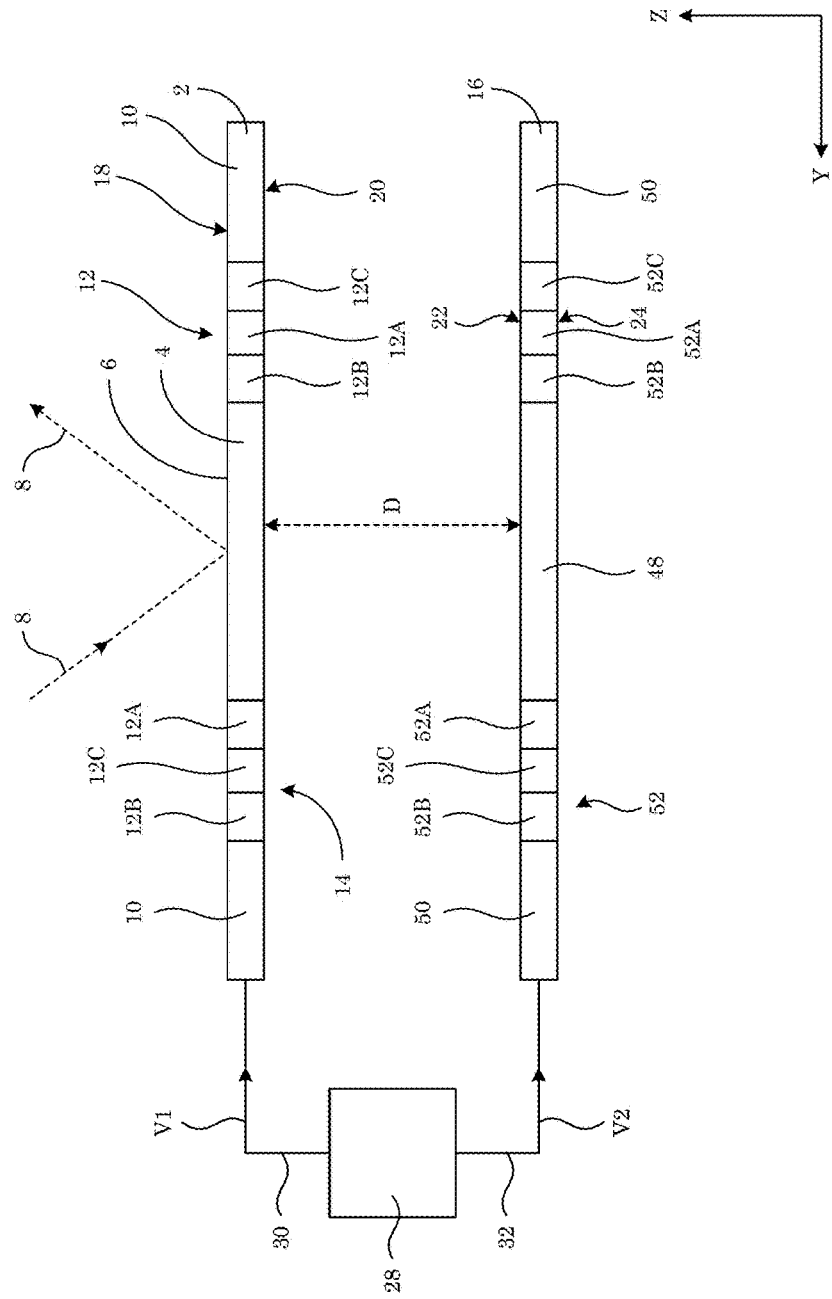
FIG. 13 shows a photon momentum sensor.

In an embodiment, with reference to FIG. 13, photon momentum sensor 100 includes first electrical member 28 in electrical communication with reflector plate 2 and bias plate 16. First electrical member 28 provides first electric potential V1 to reflector plate 2 via wire 30; and second electric potential V2 to bias plate 16 via wire 32.

Figure 14:
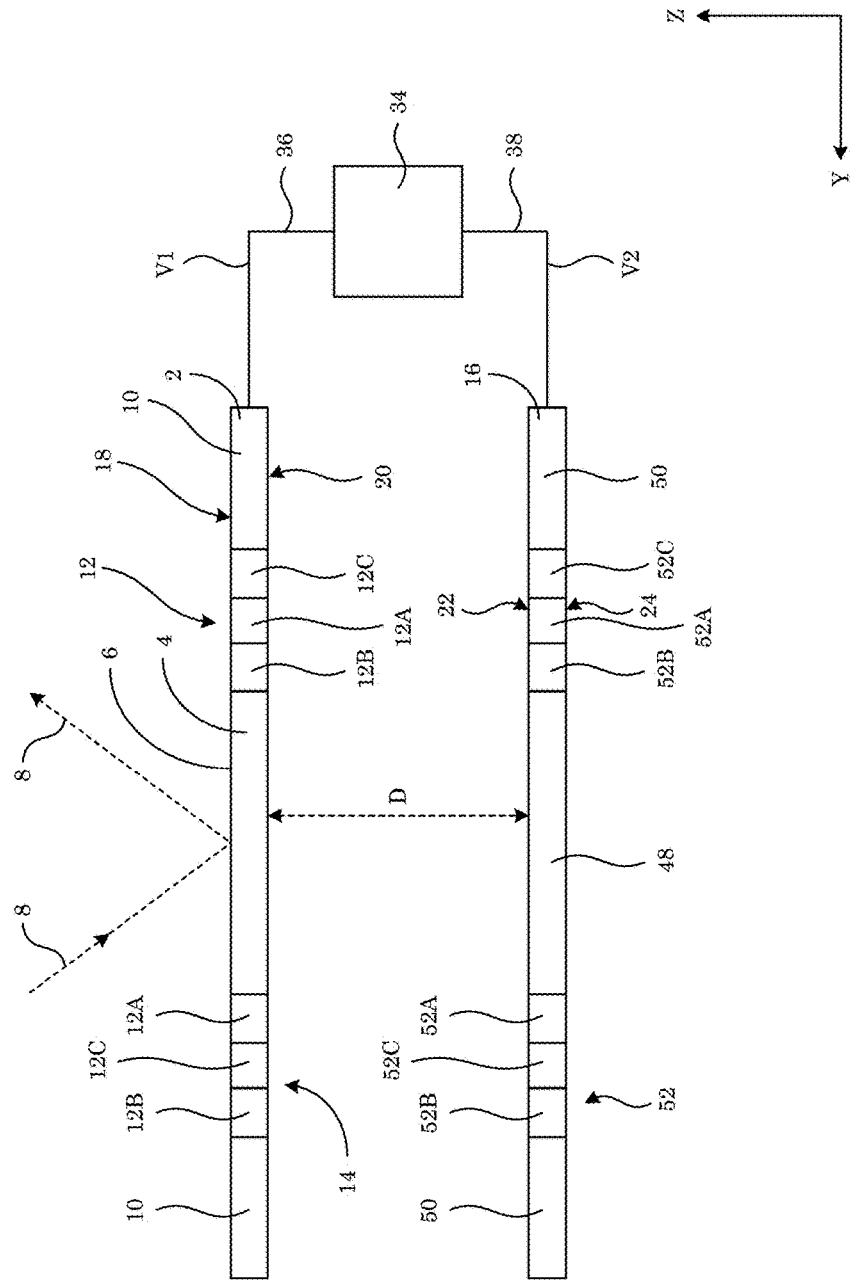
FIG. 14 shows a photon momentum sensor.

In an embodiment, with reference to FIG. 14 photon momentum sensor 100 includes second electrical member 34 in electrical communication with reflector plate 2 and bias plate 16 and that determines a capacitance of reflector plate 2 and bias plate 16.

Figure 15:
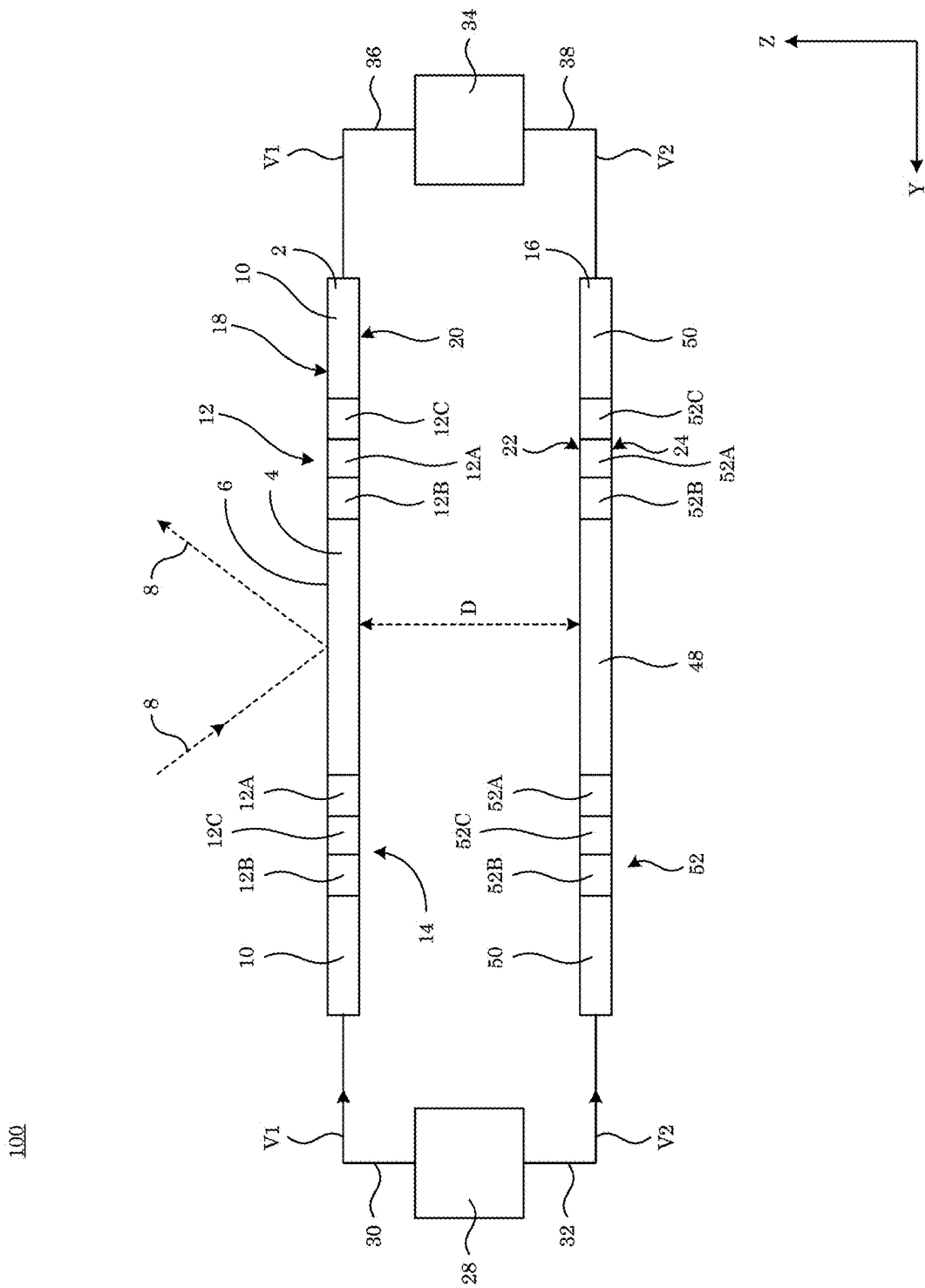
FIG. 15 shows a photon momentum sensor.

In an embodiment, with reference to FIG. 15, photon momentum sensor 100 includes: first electrical member 28 in electrical communication with reflector plate 2 and bias plate 16, wherein first electrical member 28 provides first electric potential V1 to reflector plate 2 via wire 30, and second electric potential V2 to bias plate 16 via wire 32; and second electrical member 34 in electrical communication with reflector plate 2 and bias plate 16 and that determines a capacitance of reflector plate 2 and bias plate 16.

Figure 16:
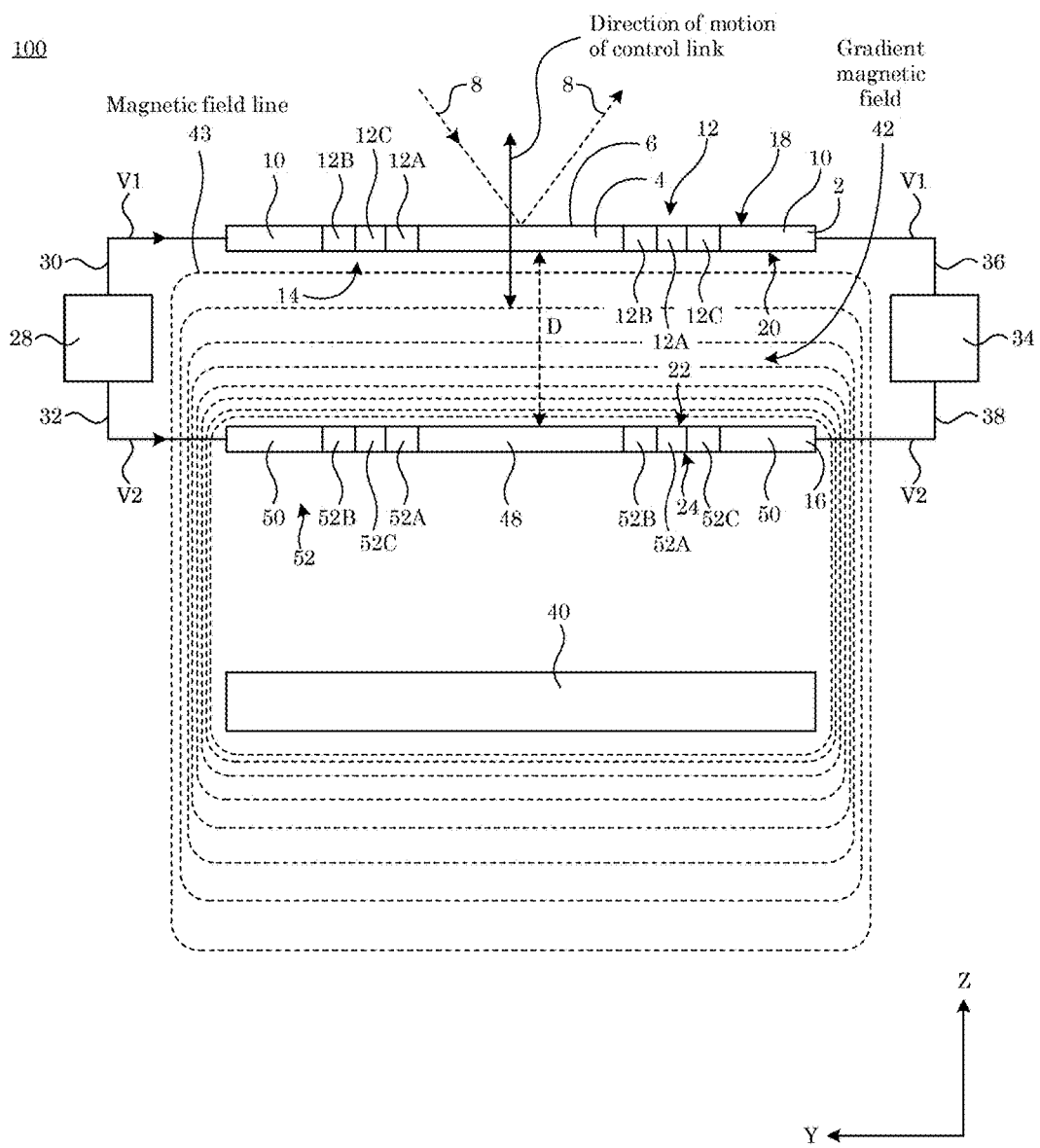
FIG. 16 shows a photon momentum sensor.

In an embodiment, with reference to FIG. 16, photon momentum sensor 100 includes magnetic member 40 (e.g., a magnet) disposed proximate to bias plate 16 and distal to reflector plate 2, wherein bias plate 16 is interposed between magnetic member 40 and reflector plate 2. Magnetic member 40 provides gradient magnetic field 42, wherein central disk 4 of reflector plate 2 moves orthogonally through gradient magnetic field 42 in response to reflection of laser light 8. Here, magnetic member 40 provides a magnetic field that includes gradient magnetic film 42 having magnetic field lines 43.

Figure 17:
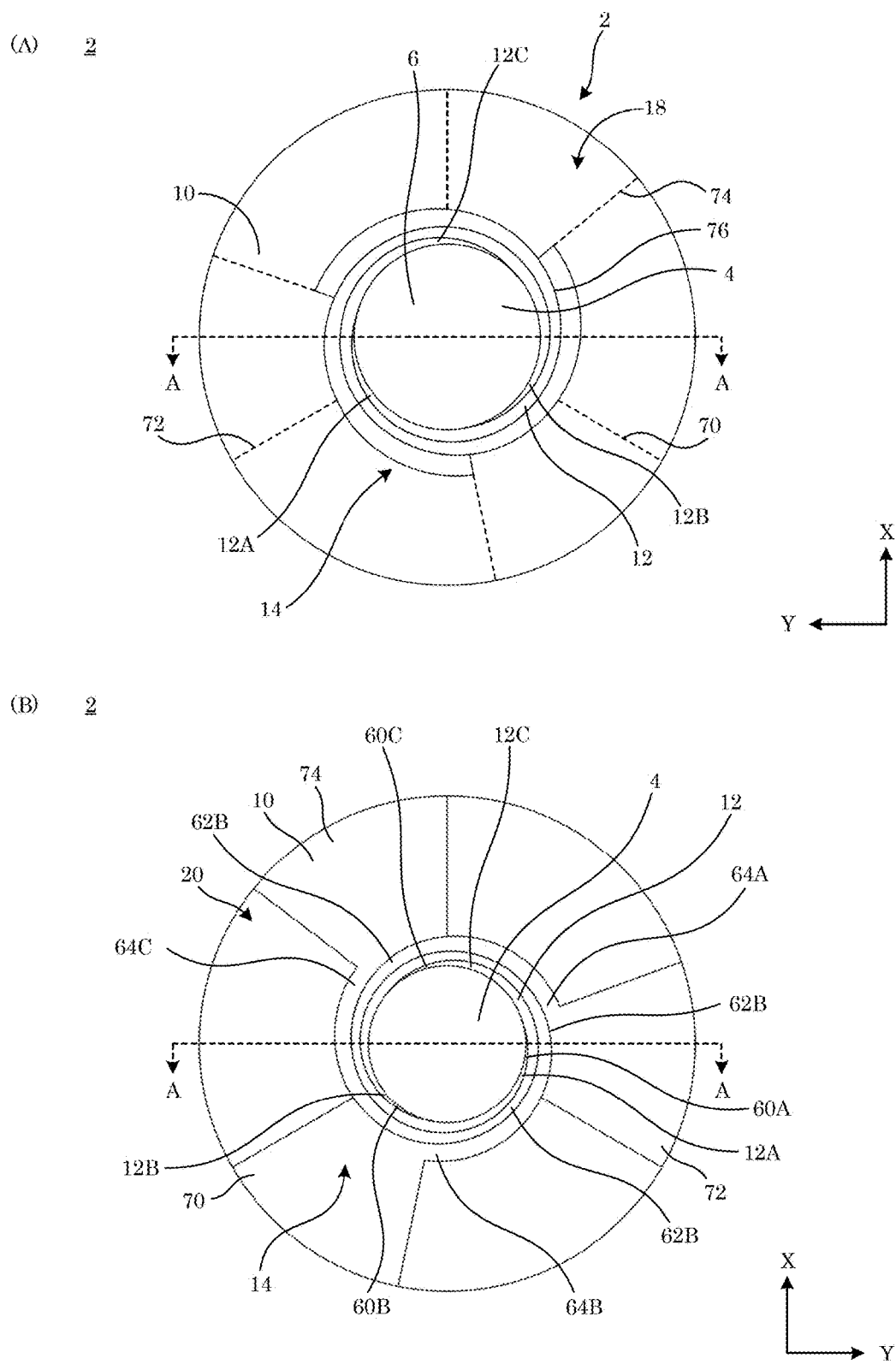
FIG. 17 shows a reflector plate in which a top view is shown in panel A and a bottom view is shown in panel B.
Figure 18:
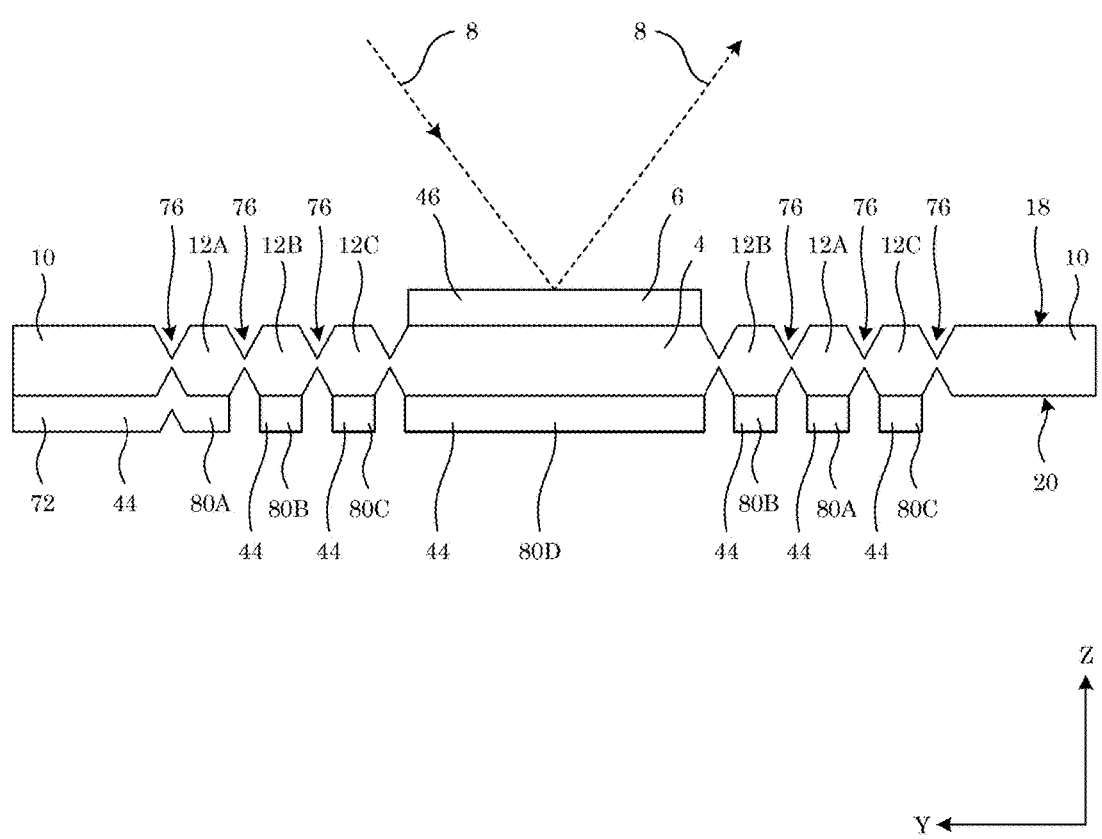
FIG. 18 shows a cross-section along line A-a of the reflector plate shown in FIG. 17.

In photon momentum sensor 100, with reference to FIG. 17 and FIG. 18, reflector plate 2 can include spring legs 12 spaced apart by separator 76. Separator 76 can be, e.g., a thin cross-section relative to spring legs 12, central disk 4, or annular member 10 (see e.g., FIG. 18). It is contemplated that separator 76 can be a material having a higher mechanical elasticity than that of spring legs 12 to provide flexural motion between annular member 10 and central disk 4 so that central disk 4 can move along a Z-axis orthogonal to the plane of annular member 10.

Central disk 4 of reflector plate 2 can include a dielectric material on which mirror 6 is disposed. Exemplary dielectric materials include an electrical insulator (e.g., a glass, polymer, ceramic, and the like), electrical semiconductor (e.g., silicon, gallium nitride, and the like), and the like, or a combination thereof. In an embodiment, central disk 4 includes silicon.

Spring legs 12 of reflector plate 2 can include a material that is a same material or in different material as central disk 4. In an embodiment, spring legs 12 includes a same material as central disk 4. According to an embodiment, spring legs 12 of reflector plate 4 include silicon. It is contemplated that individual spring legs 12 (12A, 12B, 12C, and the like) can include a different material for individual spring legs 12.

Annular member 10 of reflector plate 2 can include a material that is a same material or a different material as central disk 44 spring legs 12. In an environment, annular member 10 of reflector plate includes silicon.

In an embodiment, electrically conductive material 44 is disposed on second surface 20 of reflector plate 2 so that second surface 20 can be capacitively coupled to third surface 22 of bias plate 16. Also, conduct material 44 provides electrical conductive the so that first spring leg 12A, second spring leg 12B, and third spring leg 12C of reflector plate 2 are in electrical communication. Accordingly, spring legs 12, central disk 4, and annular member 10 of reflector plate 2 can be in electrical communication. It is contemplated that spring legs 12, central disk 4, and annular member 10 of reflector plate 2 can be electrically shorted together and at a same electric potential.

In an embodiment, mirror 6 includes coating 46 disposed on first surface 18 of central disk 4. Coating 46 can be in optical coating selected to reflect laser light 8 at a wavelength, at an angle of incidence, or a combination thereof. Coating 46 reflects a wavelength from 200 nanometers to 6000 nanometers, specifically from 250 nm to 4500 nm, and more specifically from 450 nm to 2500 nm.

A thickness of central disk 4 can be selected to reflect laser light 8. The thickness of central disk 4 can be, e.g., from several micrometers to several millimeters, specifically from 1 µm to 10 mm, more specifically from 1 µm to 500 µm, and more specifically from 1 µm to 50 µm.

A shape of central disk 4 can be any shape effective to receive and to reflect laser light 8 from mirror 6, e.g., circular, ellipsoidal, polygonal, and the like. It is contemplated that mirror 6 receives all of laser light 8 such that laser light 8 does not radiate spring legs 12 and does not irradiate annular member 10 for the portion (e.g., all) of laser light 8 that is to have optical power determined by photon momentum sensor 100. A size (e.g., a smallest linear dimension across first surface 18) of central disk 4 can be selected to receive and to reflect all of laser light 8. Exemplary sizes of central disk 4 can be from several micrometers to several centimeters, specifically from 1 μm to 5 cm, more specifically from 1 μm to 2 mm, and more specifically from 1 μm to 500 μm.

Electrically conductive material 44 disposed on second surface 20 of reflector plate 2 can include a metal, conductive polymer, doped semiconductor, doped glass, and the like. Exemplary conduct material 44 includes gold, indium tin oxide, and the like. A thickness of conductive material 44 is effective to capacitively coupled reflector plate 2 with bias plate 16.

Bias plate 16 can include a same or different material as reflector plate 2. In an embodiment, bias plate 16 is an electrically conductive plate, e.g., a gold-plated silicon wafer, and the like. In an embodiment, bias plate 16 is substantially similar to reflector plate 2. In some embodiments, bias plate 6 includes a mirror on fourth surface 24 with an absence of a mirror on third surface 22 of bias plate 6. In this manner, first laser light 8 can reflect from mirror 6 disposed on first surface 18 of reflector plate 2, and a second laser light can reflect from the mirror disposed on fourth surface 24 of bias plate 16, wherein first laser light 8 can be turned off when the second laser light is received by the mirror disposed on second surface 24 of bias plate 16, and vice versa.

With reference to FIG. 17, spring legs (12A, 12B, 12C) include inner arm (60A, 60B, 60C) at an end of spring leg (12A, 12B, 12C, respectively) proximate to central disk 4 and distal to annular member 10, outer arm (64A, 64B, 64C) distal to central disk 4 and proximate to annular member 10, and middle arm (62A, 62B, 62C) interposed between the inner arm (60A, 60B, 60C) and outer arm (64A, 64B, 64C). Neighboring spring arms (12A, 12B, 12C) are spaced apart by separator 76.

Spacer 26 separates reflector plate 2 and bias plate 16. Annular member of reflector plate 2 can be spaced apart from bias plate 16 at a distance effective to form a capacitive structure without electrically shorting bias plate 16 to reflector plate 2. The distance can be a few micrometers to a few millimeters. It is contemplated that distance D that separates central disk 4 of selector plate 2 from bias plate 16 effective to form a capacitive structure therebetween without electrically shorting bias plate 16 to reflector plate 2. Distance D can be, e.g., a few micrometers to a few millimeters.

Spacer 26 can electrically insulate reflector plate 2 from bias plate 16. Spacer 16 can include an electrically insulating polymer, glass, ceramic, or a combination comprising at least one of the foregoing electrically insulating materials. In an embodiment, spacer 26 includes the polymer that comprises polyimide (e.g., a polyimide commercially available under the tradename KAPTON).

Set forth below are some embodiments of the photon momentum sensor disclosed herein.

A photon momentum sensor comprises: a reflector plate that comprises: a central disk comprising a mirror that reflects a laser light, the central disk moving in response to reflection of the laser light; an annular member disposed peripherally around the central disk and in mechanical communication with the central disk such that: the central disk moves orthogonally to a plane of the annular member; a plurality of spring legs interposed between the central disk and the annular member and in mechanical communication with the central disk and the annular member, the plurality of spring legs comprising a first spring leg, a second spring leg, and a third spring leg, such that: the spring legs are interleaved; neighboring spring legs are spaced apart; and the spring legs individually are arranged in an Archimedean spiral that provides orthogonal motion of the central disk relative to the plane of the annular member and prohibits the central disk from being oriented in a manner that is not parallel to a plane of the annular member; and a bias plate disposed opposing the reflector plate such that: the central disk of the reflector plate moves orthogonally to a plane of the bias plate in response to reflection of the laser light, and the central disk and the bias plate are arranged spaced apart as a capacitive structure. In an embodiment, the photon momentum sensor further comprises: a first electrical member in electrical communication with the reflector plate and the bias plate and that provides: a first electric potential to the reflector plate; and a second electric potential to the bias plate. In an embodiment, the photon momentum sensor further comprises: a second electrical member in electrical communication with the reflector plate and the bias plate and that determines a capacitance of the reflector plate and the bias plate. In an embodiment, the photon momentum sensor further comprises: a magnetic member disposed proximate to the bias plate and distal to the reflector plate, the bias plate being interposed between the magnetic member and the reflector plate, wherein the magnetic member provides a gradient magnetic field, such that the central disk of the reflector plate moves orthogonally through the gradient magnetic field in response to reflection of the laser light. In an embodiment, the photon momentum sensor further comprises: a spacer interposed between the annular member of the reflector plate and the bias plate and that spaces apart the reflector plate and the bias plate, wherein the spacer is present between the annular member of the reflector plate and the bias plate but absent between the central disk of the reflector plate and the bias member, such that the second surface of the central disk of the reflector plate and the third surface of the bias plate are exposed to one another. In an embodiment, the spacer electrically insulates the reflector plate from the bias plate. In an embodiment, the spacer comprises an electrically insulating polymer, glass, ceramic, or a combination comprising at least one of the foregoing electrically insulating materials. In an embodiment, the spacer comprises the polymer that comprises polyimide. In an embodiment, the reflector plate further comprises: a first surface on which the mirror is disposed; and a second surface that is opposite the first surface and which opposes a third surface of the bias plate, wherein the second surface is electrically conductive. In an embodiment, the bias plate further comprises: the third surface that opposes the second surface of the reflector plate, the third surface being electrically conductive, and a fourth surface that is opposite the third side. In an embodiment, the central disk of the reflector plate further comprises a dielectric material on which the mirror is disposed. In an embodiment, the central disk of the reflector plate further comprises a dielectric material that comprises silicon on which the mirror is disposed. In an embodiment, the plurality of spring legs of the reflector plate comprises a material that is a same material as the central disk. In an embodiment, the plurality of spring legs of the reflector plate comprises silicon. In an embodiment, the annular member of the reflector plate comprises a material that is a same material as the central disk. In an embodiment, the annular member of the reflector plate comprises silicon. In an embodiment, an electrically conductive material is disposed on a second surface of the reflector plate. In an embodiment, the first spring leg, the second spring leg, and the third spring leg of the reflector plate are in electrical communication. In an embodiment, the plurality of spring legs, the central disk, and the annular member of the reflector plate are in electrical communication. In an embodiment, the plurality of spring legs, the central disk, and the annular member of the reflector plate are at a same electric potential. In an embodiment, the mirror comprises a coating disposed on a first surface of the central disk. In an embodiment, the coating reflects a wavelength from 250 nanometers to 3500 nanometers. In an embodiment, the reflector plate receives a first electric potential, and the bias plate receives a second electric potential, and the central disk of the reflector plate is electrostatically attracted to the bias plate in response to receipt of the first electric potential by the reflector plate and the second electric potential by the bias plate to provide a distance of separation between the reflector plate and the bias plate. In an embodiment, the bias plate comprises an electrically conductive material. In an embodiment, the bias plate comprises: a central disk. In an embodiment, the bias plate further comprises: an annular member disposed peripherally around the central disk of the bias plate and in mechanical communication with the central disk of the bias plate such that: the central disk of the bias plate moves orthogonally to a plane of the annular member of the bias plate. In an embodiment, the bias plate further comprises: a plurality of spring legs interposed between the central disk of the bias plate and the annular member of the bias plate and in mechanical communication with the central disk of the bias plate and the annular member of the bias plate, the plurality of spring legs comprising a first spring leg, a second spring leg, and a third spring leg, such that: the spring legs of the bias plate are interleaved; neighboring spring legs of the bias plate are spaced apart; and the spring legs of the bias plate individually are arranged in an Archimedean spiral that provides orthogonal motion of the central disk of the bias plate relative to the plane of the annular member of the bias plate. In an embodiment, the central disk of the bias plate further comprises a dielectric material. In an embodiment, the central disk of the bias plate further comprises a dielectric material that comprises silicon. In an embodiment, the plurality of spring legs of the bias plate comprises a material that is a same material as the central disk of the bias plate. In an embodiment, the plurality of spring legs of the bias plate comprises silicon. In an embodiment, the annular member of the bias plate comprises a material that is a same material as the central disk of the bias plate. In an embodiment, the annular member of the bias plate comprises silicon. In an embodiment, an electrically conductive material is disposed on a third surface of the bias plate. In an embodiment, the first spring leg, the second spring leg, and the third spring leg of the bias plate are in electrical communication. In an embodiment, the plurality of spring legs, the central disk, and the annular member of the bias plate are in electrical communication. In an embodiment, the plurality of spring legs, the central disk, and the annular member of the bias plate are at a same electric potential.

In an embodiment, a process for making photon momentum sensor 100 includes providing a substrate (e.g., a circular chip of silicon wafer); depositing a high reflectivity coating on the substrate to form a mirror disposed on a central portion of the substrate; disposing spring legs around the mirror by cutting the silicon wafer via deep etching of the silicon into an Archimedean spiral, e.g., with three spring legs. Accordingly, force from radiation power of laser light subjected to the mirror displaces the mirror attached to the spring legs in a direction normal to a plane of the mirror. On a back side of the spring legs, a metal layer is deposited as a top electrode of to form contacts of a capacitor in combination with the bias plate. It is contemplated that the coating for the mirror is optimized for peak reflectivity at the lasing wavelength at the angle of incidence the laser light. The process further can include disposed the bias plate proximate to the reflector plate to form the capacitive structure. Wiring can be attached to the electrodes of the reflector plate and the bias plate to provide electrical communication with an electrical member for provision of voltage thereto, measurement of capacitance, or a combination thereof. The process can include disposing a magnet proximate to the bias plate to provide a gradient magnetic field through which the reflector plate can move. A spacer can be disposed between the reflector plate and the bias to electrically isolate the reflector plate from the bias plate.

Photon momentum sensor 100 has numerous beneficial uses, including as a laser power meter (e.g., a fast laser power meter, sensitive laser power meter, non-exclusive laser power to measure laser power and, through reflection of laser light, provides laser power to be used elsewhere), a laser power sensor in laser-based manufacturing (e.g., in a laser welding or cutting head or at the laser delivery point of an additive manufacturing instrument), and the like.

Photon momentum sensor 100 has numerous advantageous and beneficial properties. In an aspect, photon momentum sensor 100 provides measurement of laser power through resulting force of a laser beam reflected from mirror 6, wherein photon momentum sensor 100 has a high sensitivity due to a small size (and response time). Moreover, photon momentum sensor 100 provides a closed-loop configuration that operates in absence of knowledge of a spring constant of the spring legs. Further, photon momentum sensor 100 provides laser power measurement that is independent of orientation of photon momentum sensor 100 with respect to gravity or environmental vibrations. Additionally, photon momentum sensor 100 compensates for distortion in its components due to thermal effects resulting from the incident laser or other aspects of the operation or external environment.

Advantageously, bias plate of photon momentum sensor 100 can be substantially identical to the reflector plate and can include a central disk connected to an annular member through three Archimedean spiral legs. In this manner, the reflector plate and the bias plate can be displaced identically under gravity or in an environment of vibration so that the separation between the reflector plate and the bias plate (and their capacitance) is independent of inertial effects such as gravity and vibration.

It is contemplated that for and imperfect mirror, the mirror can experience heating during operation of photon momentum sensor 100. Heating can distort the reflector plate or the bias plate of photon momentum sensor 100. The springs legs can be thermally compensated by applying a compensating coating (e.g., a metal plating on the second surface (or fourth surface) as well as the first surface (or third surface)) to symmetrize thermal distortion and make photon momentum sensor 100 thermally immune. Thermal immunity can be implemented in a different way by making the mirror or spring leg substrate of a doped silicon material to have an electrically conductive substrate in an absence of the metal coating on the reflector plate, bias plate, spring legs, or the like.

To damp vibration of the spring legs (e.g., to suppress mechanical resonance), the gradient magnetic field can be present that includes, e.g., a fixed magnet such that there is a magnetic field gradient in the direction normal to the plane of the reflector plate and the bias plate.

Beneficially, to sense the displacement of the mirror under radiation pressure, an electrical capacitive bridge sensor is provided in photon momentum sensor 100 and that includes synchronous demodulation for capacitive sensing with high sensitivity.

For closed loop operation of photon momentum sensor 100, to avoid nonlinear response of the displacement of reflector plate with laser power of the laser light, a closed-loop configuration includes sensing the displacement of the reflector plate with respect to the bias plate and applying a bias voltage between the reflector plate and the bias plate. Here, an attractive force is applied between the reflector plate and the bias plate. A bias attractive force is applied before subjecting the mirror of the reflector plate to the laser light. When the laser light is incidence on the mirror of the reflector plate and pushes on the central disk of the reflector plate, the displacement between the reflector plate and the bias plate is sensed as a change in capacitance and a reduction in the bias voltage between the reflector plate and the bias plate that decreases an electrical attractive force between reflector plate and the bias plate, wherein the spring legs displace the reflector plate in an opposite direction of the force imparted thereto by the laser light. When the mirror of the reflector plate returns to a null position (i.e., the position the central disk was prior to the laser light applied to the mirror), the compensating electrical force is equal to the applied radiation pressure force from which the laser power is measured. Unexpectedly and advantageously, this closed loop operation of photon momentum sensor 100 occurs in an absence of knowledge of the spring constant of the spiral legs.

The articles and processes herein are illustrated further by the following Examples, which are non-limiting.

EXAMPLES

Example 1

Test of Photon Momentum Sensor

Figure 19:
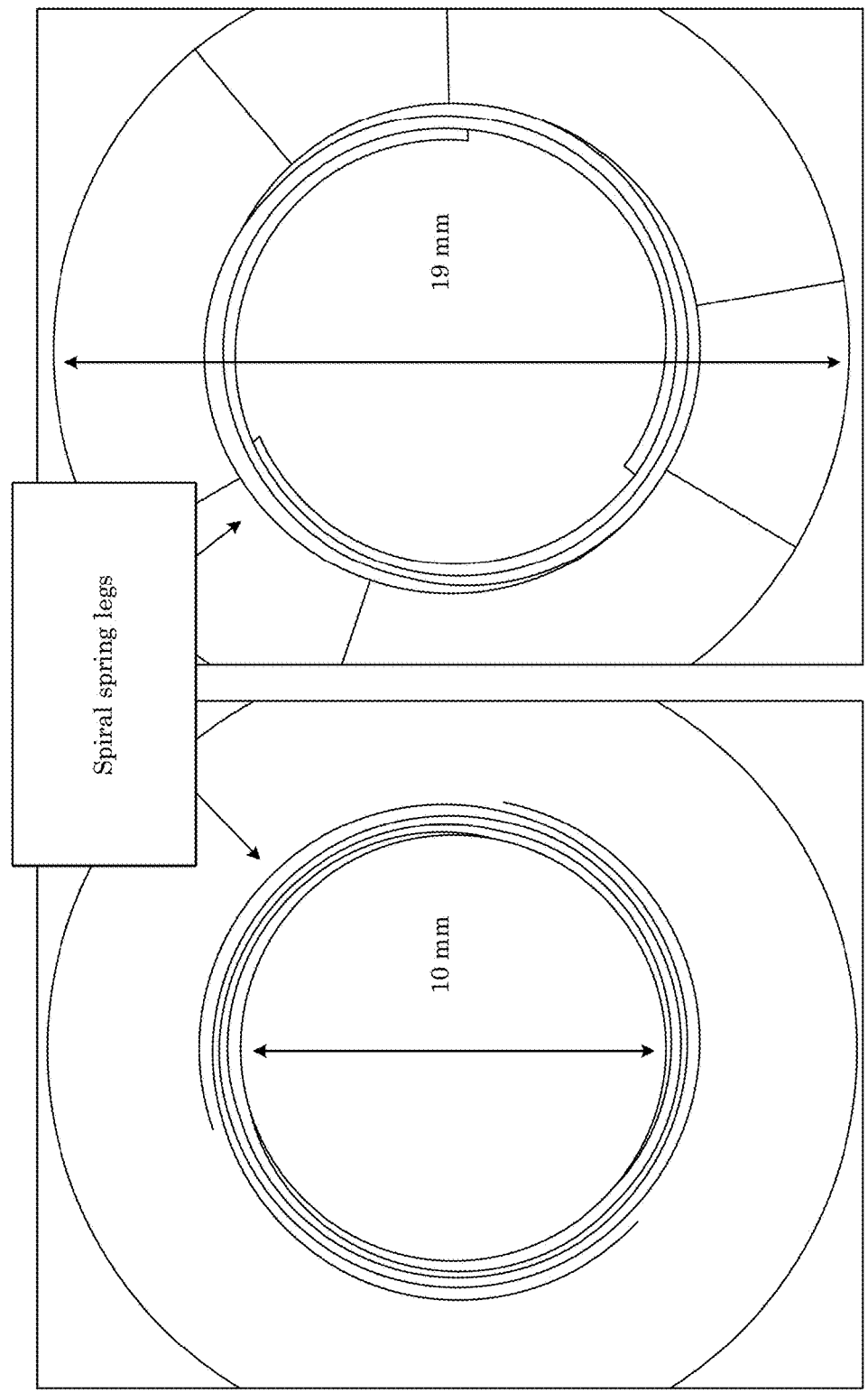
FIG. 19 shows photographs of a photon momentum sensor in which panel a shows a top view and panel B shows a bottom view.

This Examples describes a photon momentum sensor that provides a small, sensitive, and fast device that includes a micro-machined silicon spring arranged as the top plate of a capacitor in a Wien bridge. Here, we present the first detection of radiation pressure by a spring-capacitive sensor. The spring is fabricated from a 19 mm diameter chip of 380 μm silicon wafer. The fabrication process includes the deposition of a 10 mm diameter distributed Bragg reflector (DBR) onto the center of the spring, which begins with the growth of dry thermal oxide, followed by e-beam deposition of 180 nm of aluminum, then plasma-enhanced chemical vapor deposition (PECVD) of 4 pairs of alternating layers of amorphous silicon and silicon dioxide with thicknesses optimized for peak reflectivity at a wavelength of 1070 nm incident on the mirror at 45°. The spring itself is cut out of the silicon wafer by way of deep reactive ion etching (DRIE) into an Archimedean spiral with three legs 125 μm wide with 100 μm gaps and 2π/3 rotation. Thus, the force from RP displaces the spring normally by tens to hundreds of nanometers. On the back side of the spring, 200 nm of gold is e-beam evaporated as the top electrode of the device capacitor with contacts. In FIG. 19, photographs of the top and bottom sides of the chip show both the mirror and the electrode with contacts. Here, photographs of the silicon spring chip are shown, wherein panel A is a top view showing the DBR mirror at the center of the spring, and panel B shows a bottom view with gold wires that trace the legs of the spring.

We used a finite element model (COMSOL) to predict the mechanical behavior of the spring. This predicted a spring constant of 42 N/m, which corresponds to 11 nm displacement when the mirror is struck by a 100 W laser. The fundamental frequency of this spring is 118 Hz. By varying the width and arc length of the spring legs, we may adjust this stiffness from an order of 1 N/m up to a few 100 N/m to meet various design requirements as dictated by the capacitive bridge sensitivity and the expected incident power range.

Figure 20:
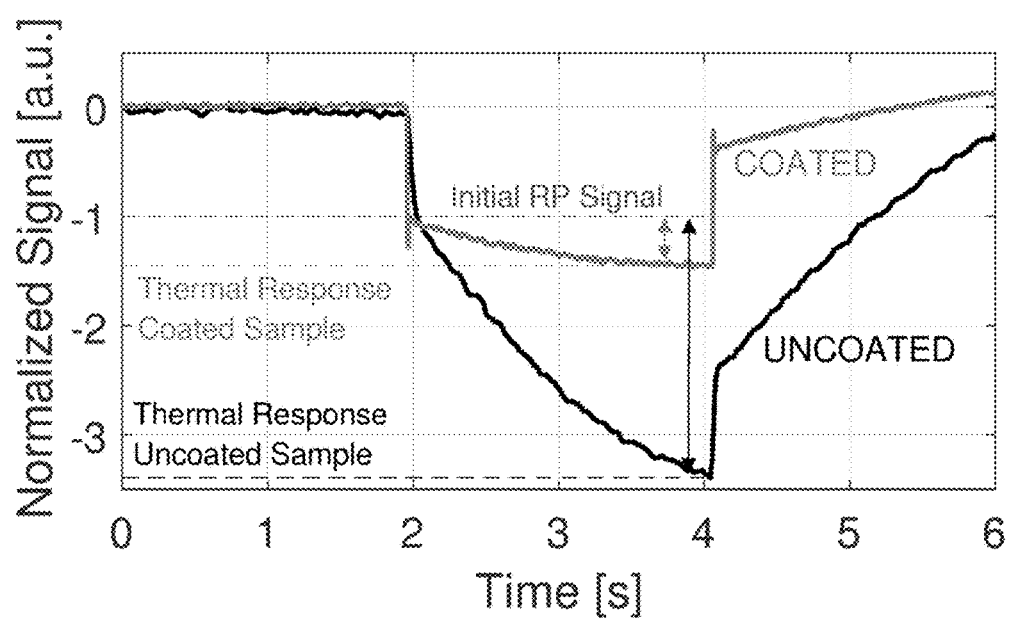
FIG. 20 shows a graph of normalized signal versus time.

For thermal strain reduction, we integrated the silicon spring chip onto a board containing electronics for a capacitive Wien bridge. As shown in FIG. 20, we detected a signal from the bridge when the mirror was illuminated with 83 W at 1070 nm from a CW fiber laser, but found that thermal straining of the device was much greater than the effect from radiation pressure (RP). FIG. 20 shows sensor signal prior to, during, and just after 2 s illumination with 83 W from a CW fiber laser at 1070 nm. The signal is normalized so that the initial displacement from RP is −1 (indicating the plate spacing decreased). In one design (labelled as UNCOATED), the thermal response almost overwhelms the RP signal. Adding a balancing coating of gold to the spring legs decreased the thermal strain by a factor greater than 5×.

The dominant source of this strain was the multilayer coating (dry thermal oxide and gold) on just one side of the silicon legs. Due to differing coefficients of thermal expansion, the legs act like cantilevers and bend when heated. We mitigated this effect with a balancing coating (200 nm thick gold) on top of the legs. Thermal drift reduced from 2.4 to 0.4 times the magnitude of RP signal with the addition of this coating (FIG. 20). A next test includes a coat gold of optimal thickness (e.g., 145 nm), found by minimizing Hsueh's expression for curvature of a multilayer stack.

Figure 21:
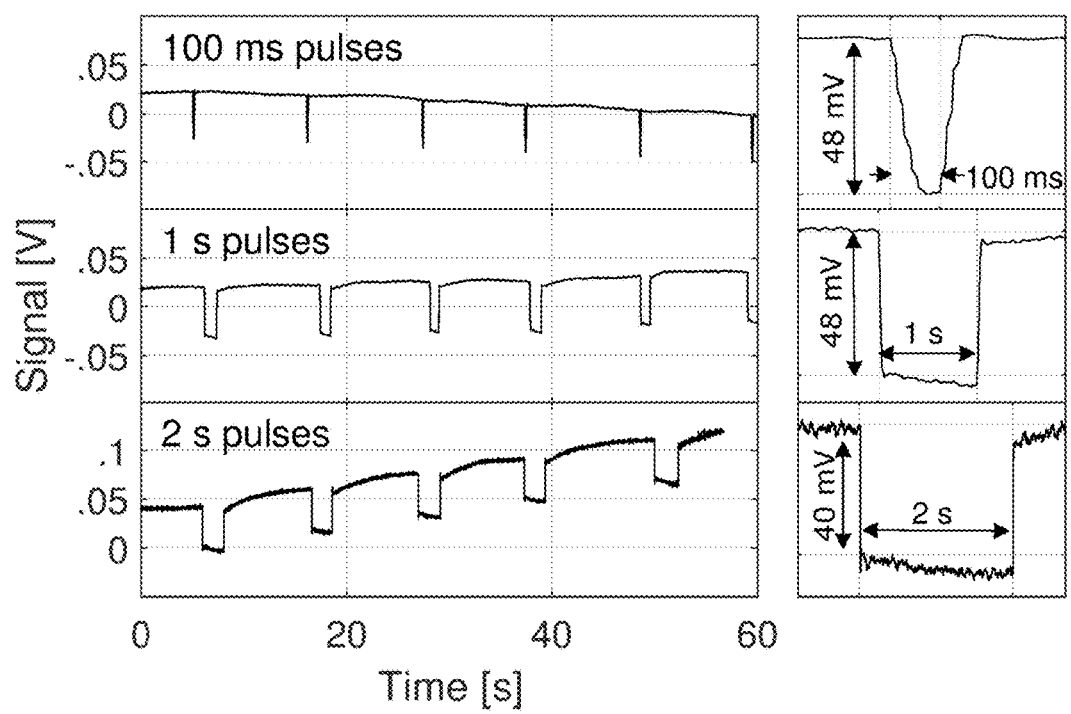
FIG. 21 shows a graph of signal versus time.

We examined our sensor's response to a small (25 W) load for short (100 ms-2 s) durations. We modulated the CW fiber laser to expose the device with 100 ms, 1 s, and 2 s duration pulses at a repetition period of 10 s for about one minute. FIG. 21 plots the raw signal of the spring-capacitive sensor for each pulse duration and provide zoomed-in views of each pulse response. Here, signal output from the capacitive bridge is shown as pulse trains with 100 ms, 1 s, and 2 s pulse lengths that impinge the sensor mirror. Feedback loop was turned off such that slow thermal drifting is apparent over the minute of data collection. (right) Signal response over a single pulse for each pulse length. Low pass filter set to 100 Hz during 2 s pulse run (set to 10 Hz for other two cases); this increased noise and decreased response time from 50 ms to 5 ms. Optical power on mirror was 20 W. We also varied the bandwidth of a noise-reducing low-pass filter from 10 Hz to 100 Hz. At the 10 Hz bandwidth, the response time of the sensor was 50 ms. This is compared to 5 ms when the low-pass filter had a bandwidth of 100 Hz. Noise increases when the filter bandwidth is increased. Additionally, we detected oscillations of the spring at approximately 111±12 Hz when the wider bandpass filter was used.

Example 2

Silicon Micromachined Photon Momentum Sensor

A force-scale-based photon momentum sensor for laser optical power measurement with dimensions of tens of centimeters and measurement times of tens of seconds has been successfully demonstrated. Advantageously, the photon momentum sensor provides an in-situ power monitor with a size and response time provided by micromechanical force sensor development for miniaturization to a few centimeters and response times to fractions of a second. Additionally, the sensitivity to tilt, acoustic vibrations, and temperature drift are suppressed using a dual spring setup.

Figure 22:
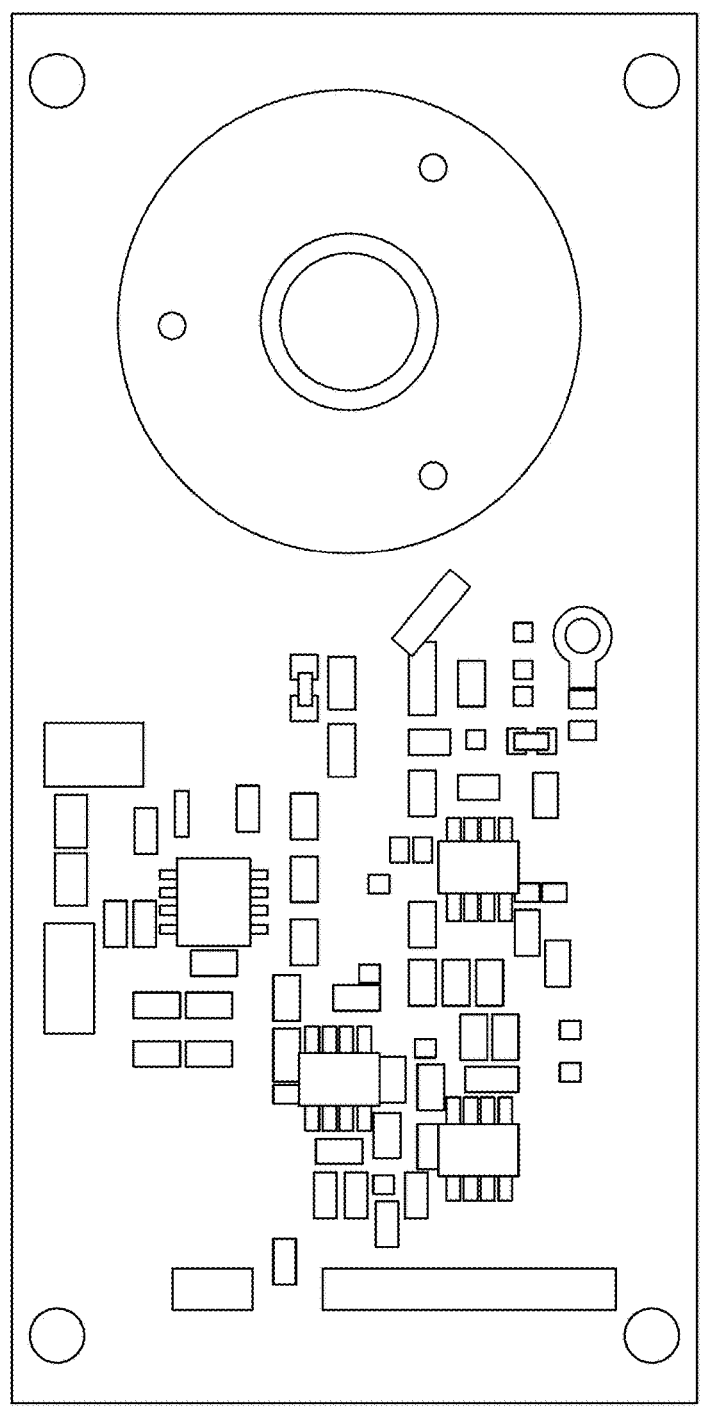
FIG. 22 shows a photograph of a photon momentum sensor.

A mirror-coated silicon disk with a diameter of 10 mm attached to a silicon annulus through thin spiral spring legs (width 125 µm, thickness 375 µm, length 45 mm) was used as a sensing element. A capacitor electrode (Ti/Au) was deposited on the side opposite the mirror. The bottom plate of the sensing capacitor was patterned on a printed circuit board. The sensor itself was clamped to the base using a machined plastic mount. The spacing between plate capacitors was provided by a thin aluminum foil washer. A photograph of the sensor is in FIG. 22.

Figure 23:
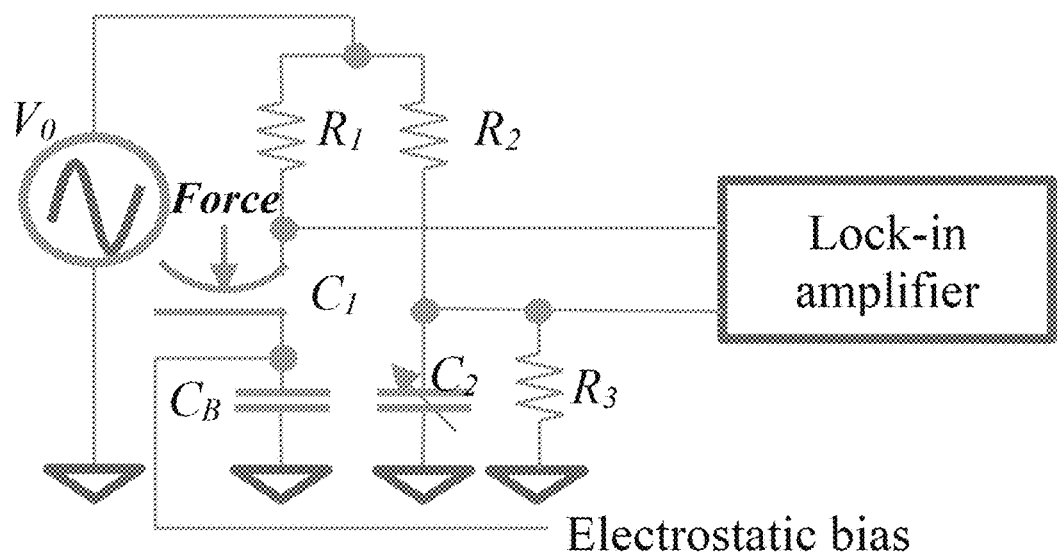
FIG. 23 shows a capacitive bridge circuit.
Figure 24:
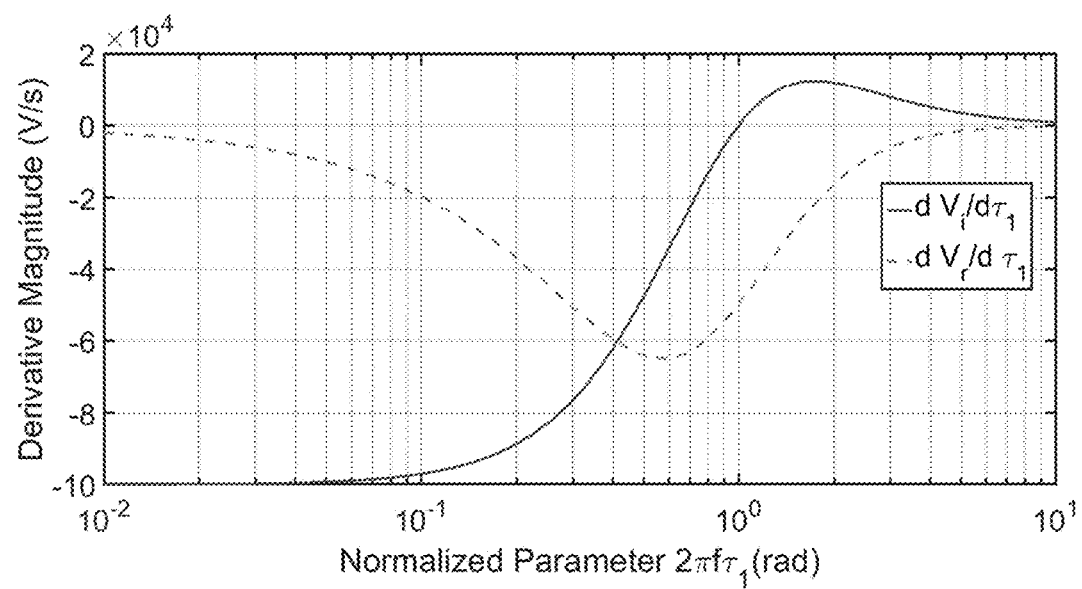
FIG. 24 shows a graph of derivative magnitude versus normalized parameter.

A Wien Bridge was used to detect the deflection of the capacitor top plate. The bridge is biased with a sinusoidal voltage with amplitude $V_0=1$ V and frequency $f=20$ kHz. The sensor arm includes a resistor $R_1$ and series combination of a sensor capacitance $C_1$ and large value blocking capacitor $C_B$. The reference arm consists of a resistor $R_2$, adjustable capacitor $C_2$, and resistor $R_3$ used to compensate the dielectric losses of the sensor capacitance (FIG. 23). The bridge difference signal is then amplified and decomposed into two orthogonal components by a digital signal processing lock-in amplifier. The sensitivity of the bridge voltage to change in the sensor capacitance is dependent on the choice of bridge components. For this reason, the relative voltage sensitivity of both orthogonal components $V_r$ and $V_i$, with respect to the normalized product $f\tau_1=fR_1C_1$ was evaluated. We found that it is advantageous to measure the change of the quadrature voltage $V_i$, (FIG. 24) as its flat maximal sensitivity plateau is stronger than the in-phase signal $V_r$ at its local sensitivity peak. Furthermore, in this flat region the non-linearity is suppressed.

To estimate the force sensitivity of our setup, we characterized the spring constant of the silicon springs (legs) In this test, the specimen was attached to a translation stage equipped with a micro-positioner. The tip of a force gauge just touched the silicon disk in the center of the spring and applied a variable force while the spring displacement was measured. The obtained spring constant K was 42 N/m. Additionally, an in-situ method of spring constant measurement was developed. An electrostatic force was applied to deflect the membrane and the deflection was recorded interferometrically.

Figure 25:
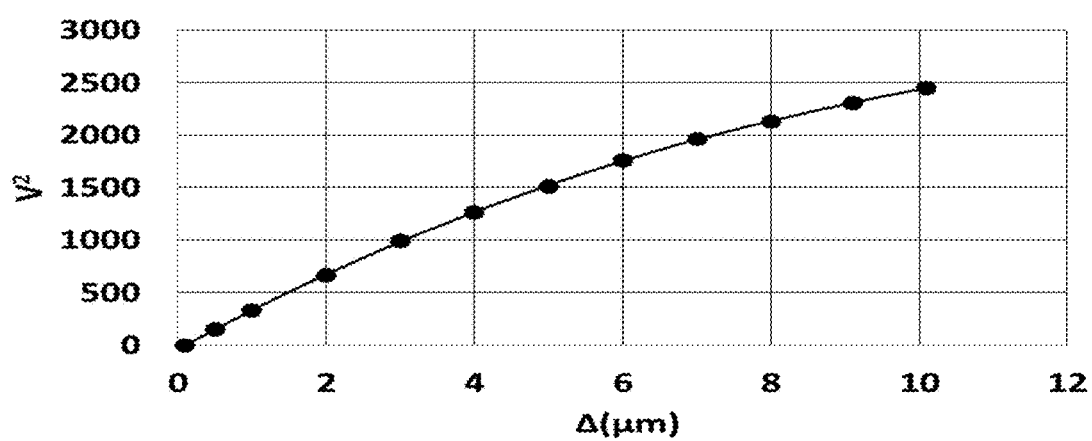
FIG. 25 shows a graph of spring deflection versus applied electrostatic voltage.

This method leads to cubic dependence of the spring deflection Δ with respect to the square of the applied voltage $V^2$ (FIG. 25). The spring constant K and the initial electrode spacing are obtained from the coefficients of this cubic polynomial. This method gave us the spring constant of 46 N/m and an initial electrode spacing of 44 µm. This in-situ technique, however, proved to be sensitive to noise in the data. To obtain a more accurate fit, a large number of measurement points in large intervals of deflections was acquired.

The capacitive sensor was placed close to a dynamic loudspeaker connected to a sine wave generator. The frequency was set to 25 Hz. The lock-in output signal and sinewave excitation were recorded by a dual channel oscilloscope. The displacement-to-voltage transfer constant was determined by simultaneous interferometer measurement of membrane deflection and bridge voltage, whilst applying an electrostatic force. The transfer constant was 0.048 µm/V.

Figure 26:
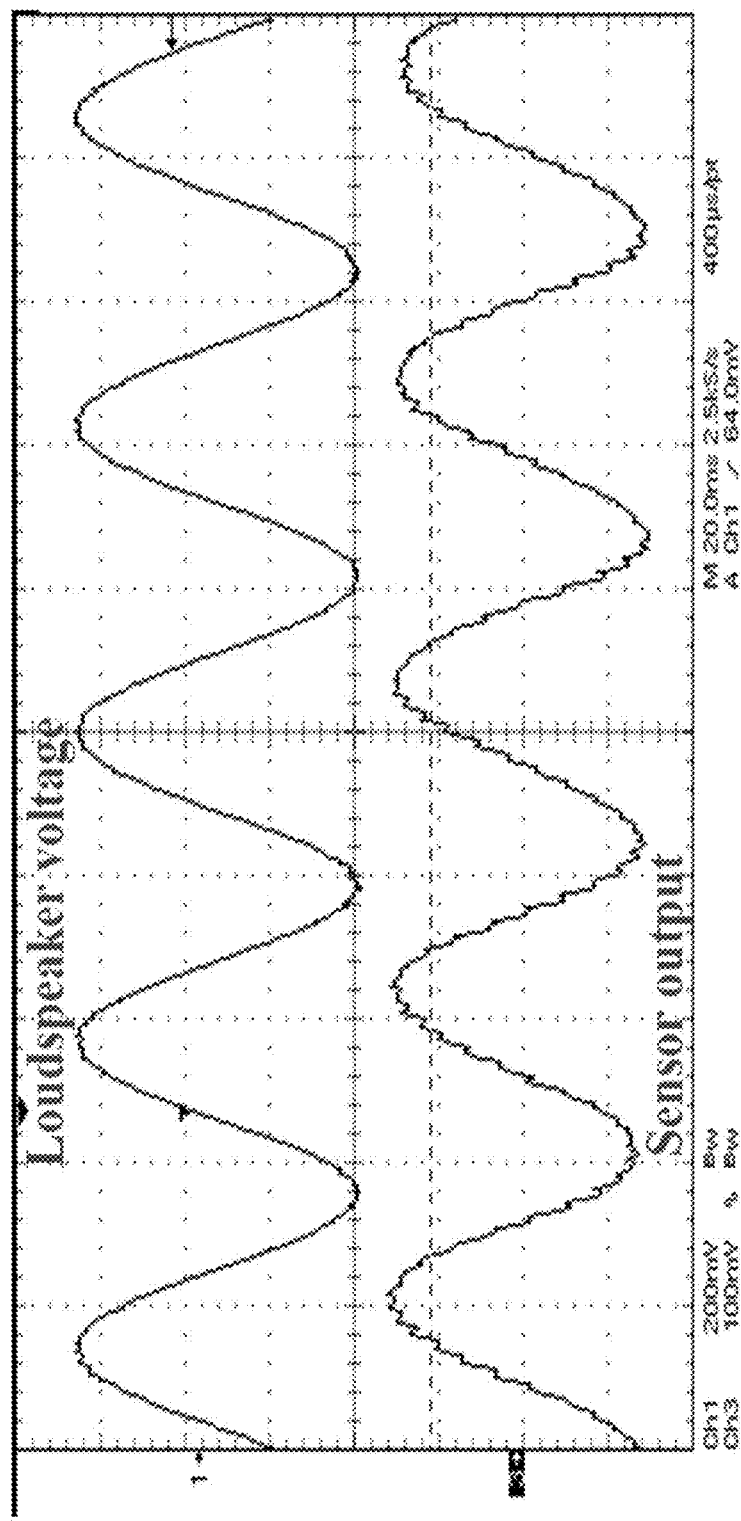
FIG. 26 shows a graph of waveforms of potential versus time.

The optimization of the capacitive bridge for sensitivity was provided above and in-situ spring constant measurement was demonstrated. From FIG. 26, the 280 mV peak-to-peak amplitude of the bridge signal indicates a 13 nm peak-to-peak spring deflection. When combined with acoustic noise floor measurements, this result indicates an equivalent optical noise floor of 2.6 W/√Hz, which provides radiation pressure base optical power sensing.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A photon momentum sensor comprising:
   a reflector plate that comprises:
     a central disk comprising a mirror that reflects a laser light, the central disk moving in response to reflection of the laser light;

an annular member disposed peripherally around the central disk and in mechanical communication with the central disk such that:
the central disk moves orthogonally to a plane of the annular member;
a plurality of spring legs interposed between the central disk and the annular member and in mechanical communication with the central disk and the annular member, the plurality of spring legs comprising a first spring leg, a second spring leg, and a third spring leg, such that:
the spring legs are interleaved;
neighboring spring legs are spaced apart; and
the spring legs individually are arranged in an Archimedean spiral that provides orthogonal motion of the central disk relative to the plane of the annular member and prohibits the central disk from being oriented in a manner that is not parallel to a plane of the annular member; and
a bias plate disposed opposing the reflector plate such that:
the central disk of the reflector plate moves orthogonally to a plane of the bias plate in response to reflection of the laser light, and
the central disk and the bias plate are arranged spaced apart as a capacitive structure.

2. The photon momentum sensor of claim 1, further comprising:
a first electrical member in electrical communication with the reflector plate and the bias plate and that provides:
a first electric potential to the reflector plate; and
a second electric potential to the bias plate.

3. The photon momentum sensor of claim 1, further comprising:
a second electrical member in electrical communication with the reflector plate and the bias plate and that determines a capacitance of the reflector plate and the bias plate.

4. The photon momentum sensor of claim 1, further comprising:
a magnetic member disposed proximate to the bias plate and distal to the reflector plate, the bias plate being interposed between the magnetic member and the reflector plate,
wherein the magnetic member provides a gradient magnetic field, such that the central disk of the reflector plate moves orthogonally through the gradient magnetic field in response to reflection of the laser light.

5. The photon momentum sensor of claim 1, further comprising:
a spacer interposed between the annular member of the reflector plate and the bias plate and that spaces apart the reflector plate and the bias plate,
wherein the spacer is present between the annular member of the reflector plate and the bias plate but absent between the central disk of the reflector plate and the bias member, such that:
the second surface of the central disk of the reflector plate and the third surface of the bias plate are exposed to one another, and.
the spacer electrically insulates the reflector plate from the bias plate.

6. The photon momentum sensor of claim 1, wherein the reflector plate further comprises:
a first surface on which the mirror is disposed; and
a second surface that is opposite the first surface and which opposes a third surface of the bias plate, wherein the second surface is electrically conductive, and the bias plate further comprises:
the third surface that opposes the second surface of the reflector plate, the third surface being electrically conductive, and
a fourth surface that is opposite the third side.

7. The photon momentum sensor of claim 1, wherein the first spring leg, the second spring leg, and the third spring leg of the reflector plate are in electrical communication.

8. The photon momentum sensor of claim 1, wherein the reflector plate receives a first electric potential, and the bias plate receives a second electric potential, and
the central disk of the reflector plate is electrostatically attracted to the bias plate in response to receipt of the first electric potential by the reflector plate and the second electric potential by the bias plate to provide a distance of separation between the reflector plate and the bias plate.

9. The photon momentum sensor of claim 1, wherein the bias plate comprises a central disk.

10. The photon momentum sensor claim 9, wherein the bias plate further comprises:
an annular member disposed peripherally around the central disk of the bias plate and in mechanical communication with the central disk of the bias plate such that:
the central disk of the bias plate moves orthogonally to a plane of the annular member of the bias plate.

11. The photon momentum sensor claim 10, wherein the bias plate further comprises:
a plurality of spring legs interposed between the central disk of the bias plate and the annular member of the bias plate and in mechanical communication with the central disk of the bias plate and the annular member of the bias plate, the plurality of spring legs comprising a first spring leg, a second spring leg, and a third spring leg, such that:
the spring legs of the bias plate are interleaved;
neighboring spring legs of the bias plate are spaced apart; and
the spring legs of the bias plate individually are arranged in an Archimedean spiral that provides orthogonal motion of the central disk of the bias plate relative to the plane of the annular member of the bias plate.

12. The photon momentum sensor of claim 9, wherein the central disk of the bias plate further comprises a dielectric material.

13. The photon momentum sensor of claim 12, wherein the central disk of the bias plate further comprises the dielectric material that comprises silicon.

14. The photon momentum sensor of claim 11, wherein the plurality of spring legs of the bias plate comprises a material that is a same material as the central disk of the bias plate.

15. The photon momentum sensor of claim 11, wherein the plurality of spring legs of the bias plate comprises silicon.

16. The photon momentum sensor of claim 10, wherein the annular member of the bias plate comprises a material that is a same material as the central disk of the bias plate.

17. The photon momentum sensor of claim 10, wherein the annular member of the bias plate comprises silicon.

18. The photon momentum sensor of claim 9, wherein an electrically conductive material is disposed on a third surface of the bias plate.

19. The photon momentum sensor of claim 11, wherein the first spring leg, the second spring leg, and the third spring leg of the bias plate are in electrical communication.

\* \* \* \* \*